United States Patent
Matsumoto

(10) Patent No.: US 9,118,855 B2
(45) Date of Patent: Aug. 25, 2015

(54) SOLID-STATE IMAGING DEVICE, SIGNAL PROCESSING METHOD THEREOF, AND ELECTRONIC APPARATUS

(71) Applicant: Sony Corporation, Tokyo (JP)

(72) Inventor: Shizunori Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/212,510

(22) Filed: Mar. 14, 2014

(65) Prior Publication Data

US 2014/0307142 A1 Oct. 16, 2014

(30) Foreign Application Priority Data

Apr. 16, 2013 (JP) ................. 2013-085481

(51) Int. Cl.
- *H04N 5/361* (2011.01)
- *H04N 5/378* (2011.01)
- *H04N 5/3745* (2011.01)
- *H04N 5/217* (2011.01)
- *H04N 5/18* (2006.01)

(52) U.S. Cl.
CPC ............. *H04N 5/361* (2013.01); *H04N 5/18* (2013.01); *H04N 5/378* (2013.01); *H04N 5/3745* (2013.01); *H04N 5/2176* (2013.01)

(58) Field of Classification Search
None
See application file for complete search history.

(56) References Cited

U.S. PATENT DOCUMENTS

| | | | | |
|---|---|---|---|---|
| 6,130,712 A | * | 10/2000 | Miyazaki et al. | 348/243 |
| 6,700,609 B1 | * | 3/2004 | Abe | 348/243 |
| 7,245,318 B2 | * | 7/2007 | Shirakawa | 348/218.1 |
| 7,564,489 B1 | * | 7/2009 | Oten et al. | 348/241 |
| 7,639,291 B2 | * | 12/2009 | Lim et al. | 348/243 |
| 7,750,955 B2 | * | 7/2010 | Shirai et al. | 348/243 |
| 7,868,935 B2 | * | 1/2011 | Egawa | 348/243 |
| 7,982,784 B2 | * | 7/2011 | Oten et al. | 348/241 |
| 8,310,568 B2 | * | 11/2012 | Taguchi | 348/243 |
| 8,576,305 B2 | * | 11/2013 | Kinoshita | 348/241 |
| 8,648,946 B2 | * | 2/2014 | Morisaki et al. | 348/294 |
| 8,872,948 B2 | * | 10/2014 | Sugiura et al. | 348/243 |
| 8,913,161 B2 | * | 12/2014 | Takita | 348/241 |
| 2003/0202111 A1 | * | 10/2003 | Park | 348/243 |
| 2005/0093991 A1 | * | 5/2005 | Yokohata et al. | 348/222.1 |
| 2005/0243193 A1 | * | 11/2005 | Gove et al. | 348/241 |
| 2005/0248665 A1 | * | 11/2005 | Morishita | 348/222.1 |
| 2006/0006426 A1 | * | 1/2006 | Inaba | 257/223 |
| 2006/0007507 A1 | * | 1/2006 | Inaba et al. | 358/474 |
| 2006/0232692 A1 | * | 10/2006 | Takane | 348/248 |
| 2007/0075772 A1 | * | 4/2007 | Kokubo et al. | 330/250 |
| 2007/0139539 A1 | * | 6/2007 | Ohara et al. | 348/243 |

(Continued)

FOREIGN PATENT DOCUMENTS

| | | |
|---|---|---|
| JP | 2004-015712 | 1/2004 |
| JP | 2006-157263 | 6/2006 |

*Primary Examiner* — Michael Osinski
(74) *Attorney, Agent, or Firm* — Fishman Stewart Yamaguchi PLLC

(57) ABSTRACT

A solid-state imaging device includes a pixel array section that includes a light-blocked pixel portion, and an effective pixel portion, and a signal process circuit that processes a pixel signal output from each pixel of the pixel array section. The signal processing circuit calculates, as held data, a row statistic obtained by performing a statistical process on pixel signals of the light-blocked pixel portion in the unit of rows, holds the held data items of a plurality of rows including a process target row of the pixel array section, randomly selects one of the held data items of a plurality of rows, and subtracts the randomly selected held data item from a pixel signal of the pixel of the process target row in the effective pixel portion.

20 Claims, 17 Drawing Sheets

(56) References Cited

U.S. PATENT DOCUMENTS

| | | | |
|---|---|---|---|
| 2007/0146496 A1* | 6/2007 | Kitani | 348/222.1 |
| 2007/0216778 A1* | 9/2007 | Hatani et al. | 348/222.1 |
| 2007/0253636 A1* | 11/2007 | Okada | 382/264 |
| 2008/0211946 A1* | 9/2008 | Uchida | 348/294 |
| 2008/0284889 A1* | 11/2008 | Kinoshita | 348/308 |
| 2009/0009822 A1* | 1/2009 | Mizuguchi et al. | 358/471 |
| 2009/0040328 A1* | 2/2009 | Suzuki | 348/222.1 |
| 2009/0091641 A1* | 4/2009 | Hattori | 348/241 |
| 2009/0244338 A1* | 10/2009 | Kume | 348/294 |
| 2010/0128150 A1* | 5/2010 | Taguchi | 348/243 |
| 2010/0194935 A1* | 8/2010 | Okado | 348/243 |
| 2010/0214462 A1* | 8/2010 | Itakura | 348/302 |
| 2010/0271514 A1* | 10/2010 | Horikawa et al. | 348/243 |
| 2011/0025874 A1* | 2/2011 | Tamaoki | 348/222.1 |
| 2011/0074986 A1* | 3/2011 | Ogata | 348/243 |
| 2011/0317055 A1* | 12/2011 | Nozaki et al. | 348/308 |
| 2012/0147210 A1* | 6/2012 | Miyashita et al. | 348/223.1 |
| 2012/0224086 A1* | 9/2012 | Takita | 348/243 |
| 2012/0273655 A1* | 11/2012 | Ise | 250/208.1 |
| 2013/0010166 A1* | 1/2013 | Morisaki et al. | 348/294 |
| 2013/0027578 A1* | 1/2013 | Matsuo | 348/222.1 |
| 2013/0027592 A1* | 1/2013 | Sugiura et al. | 348/243 |
| 2014/0027611 A1* | 1/2014 | Patel | 250/208.1 |
| 2014/0293098 A1* | 10/2014 | Nishizawa | 348/243 |
| 2015/0070545 A1* | 3/2015 | Ohsawa et al. | 348/299 |

* cited by examiner

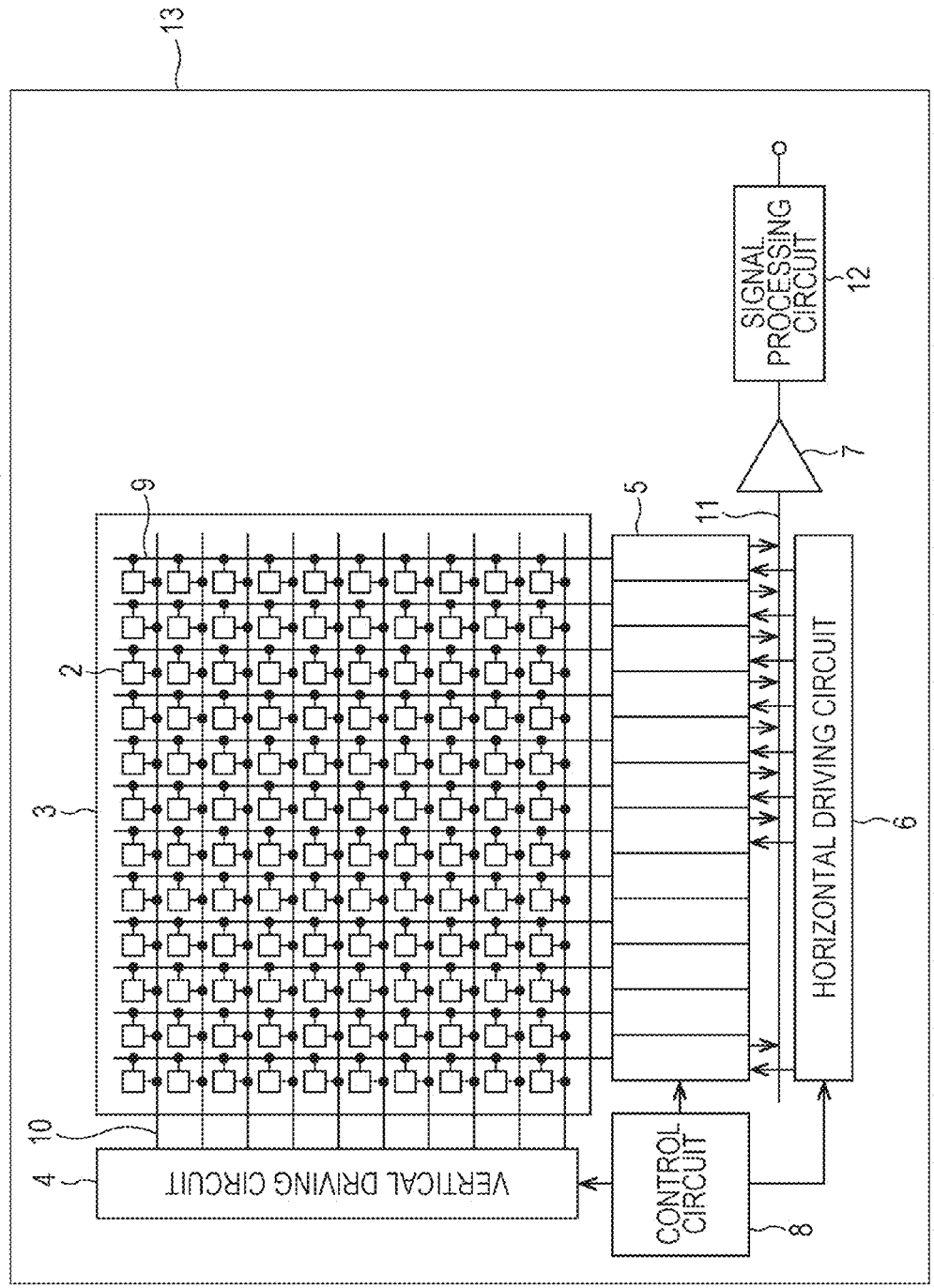

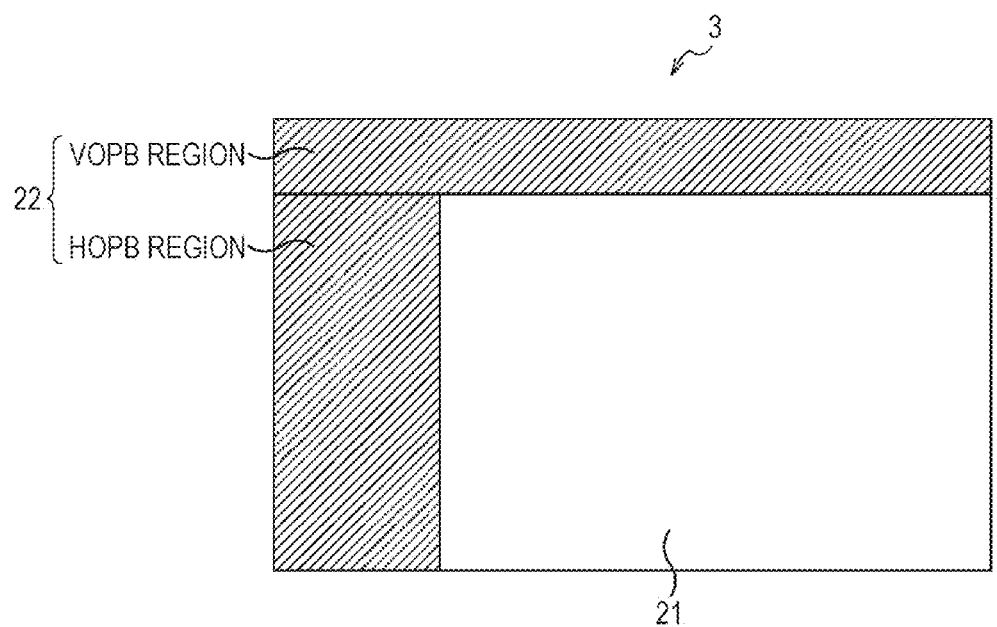

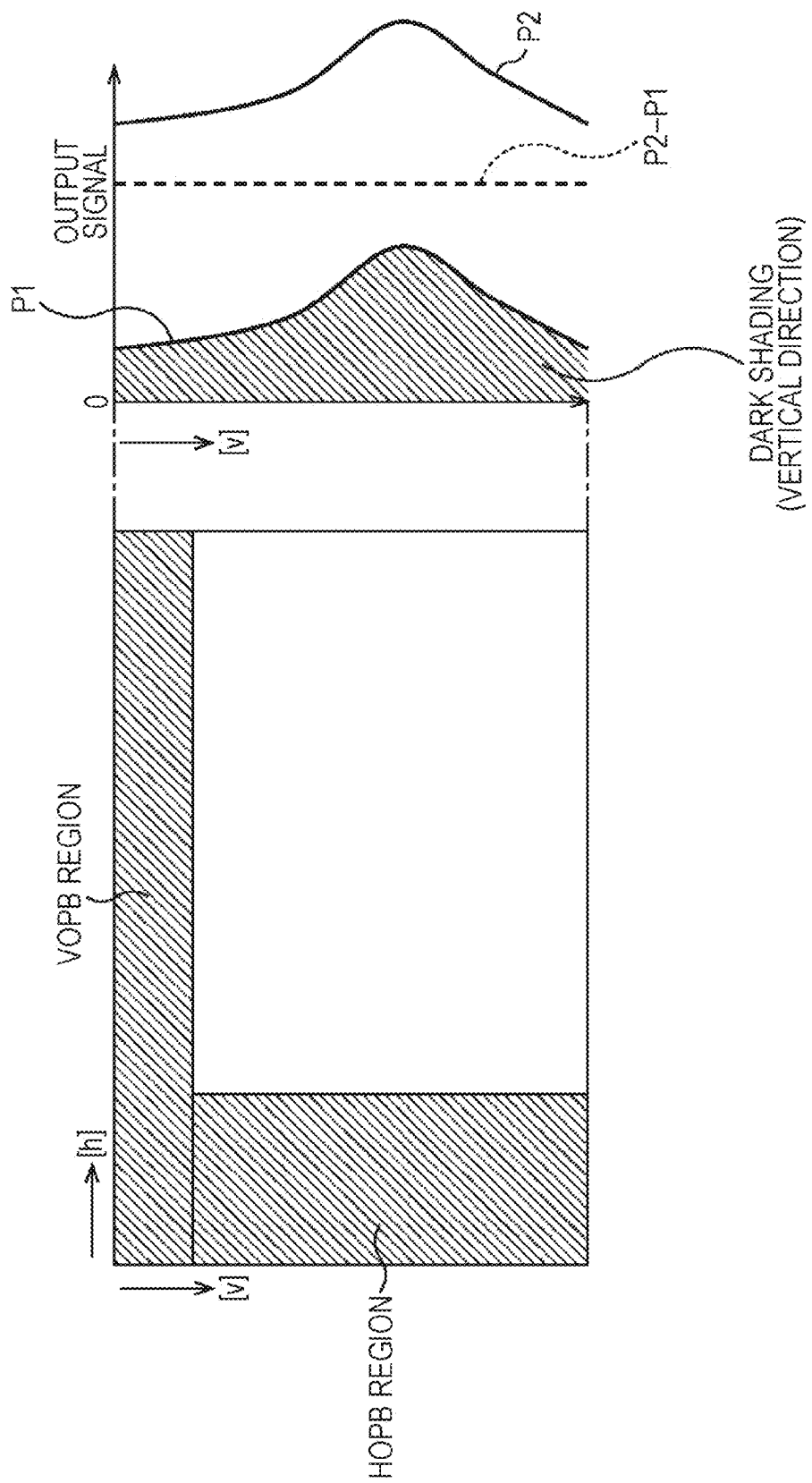

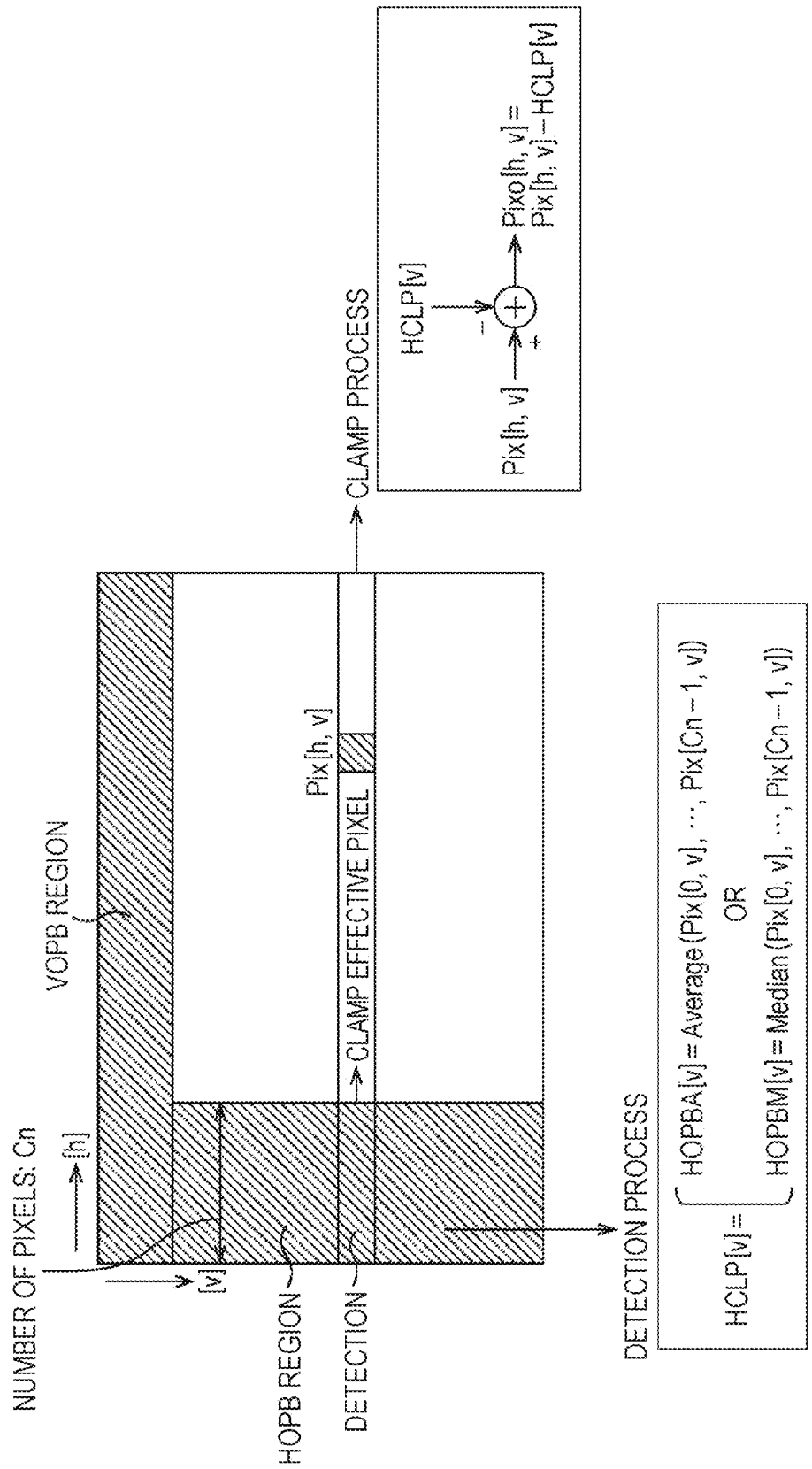

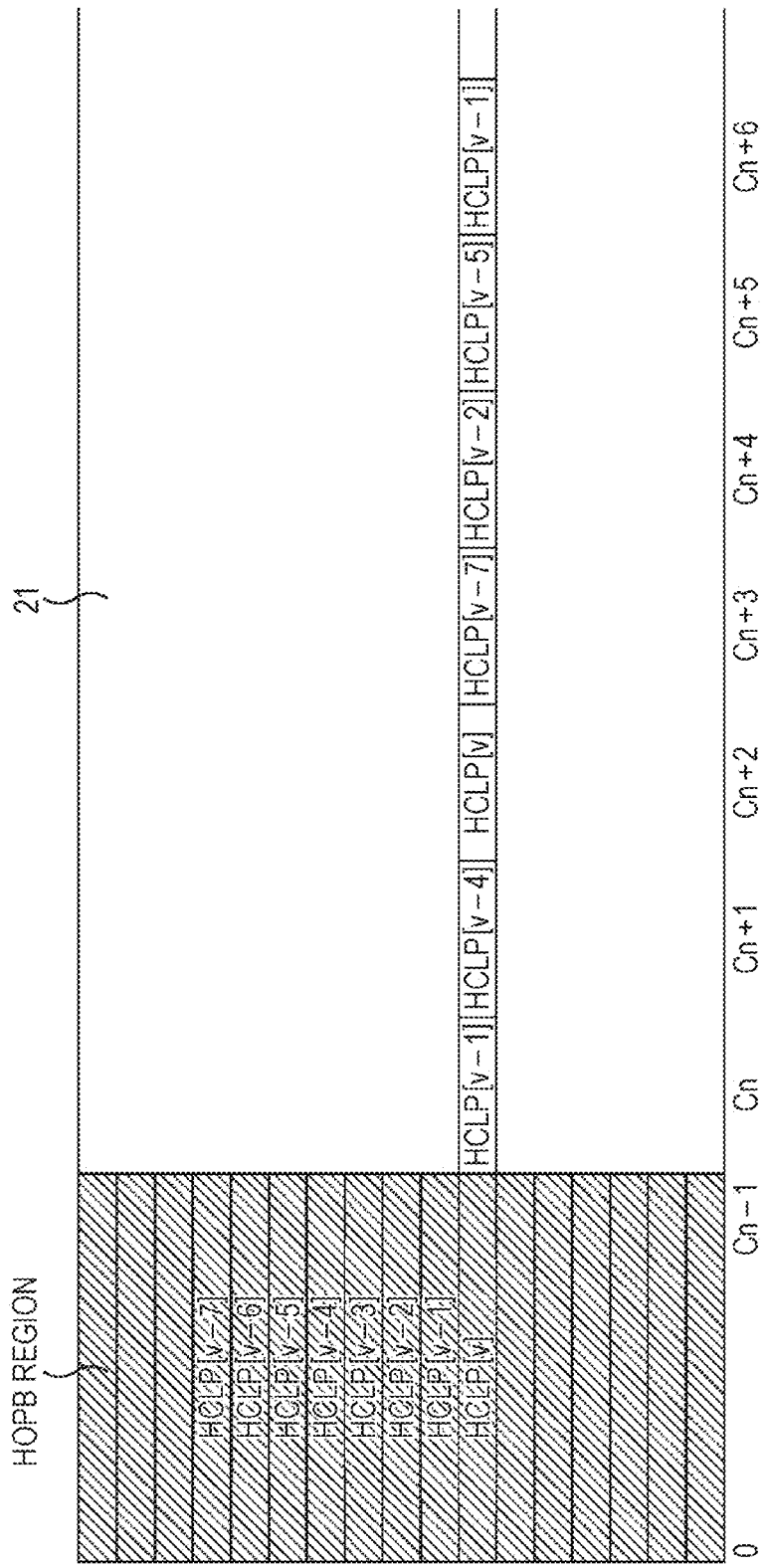

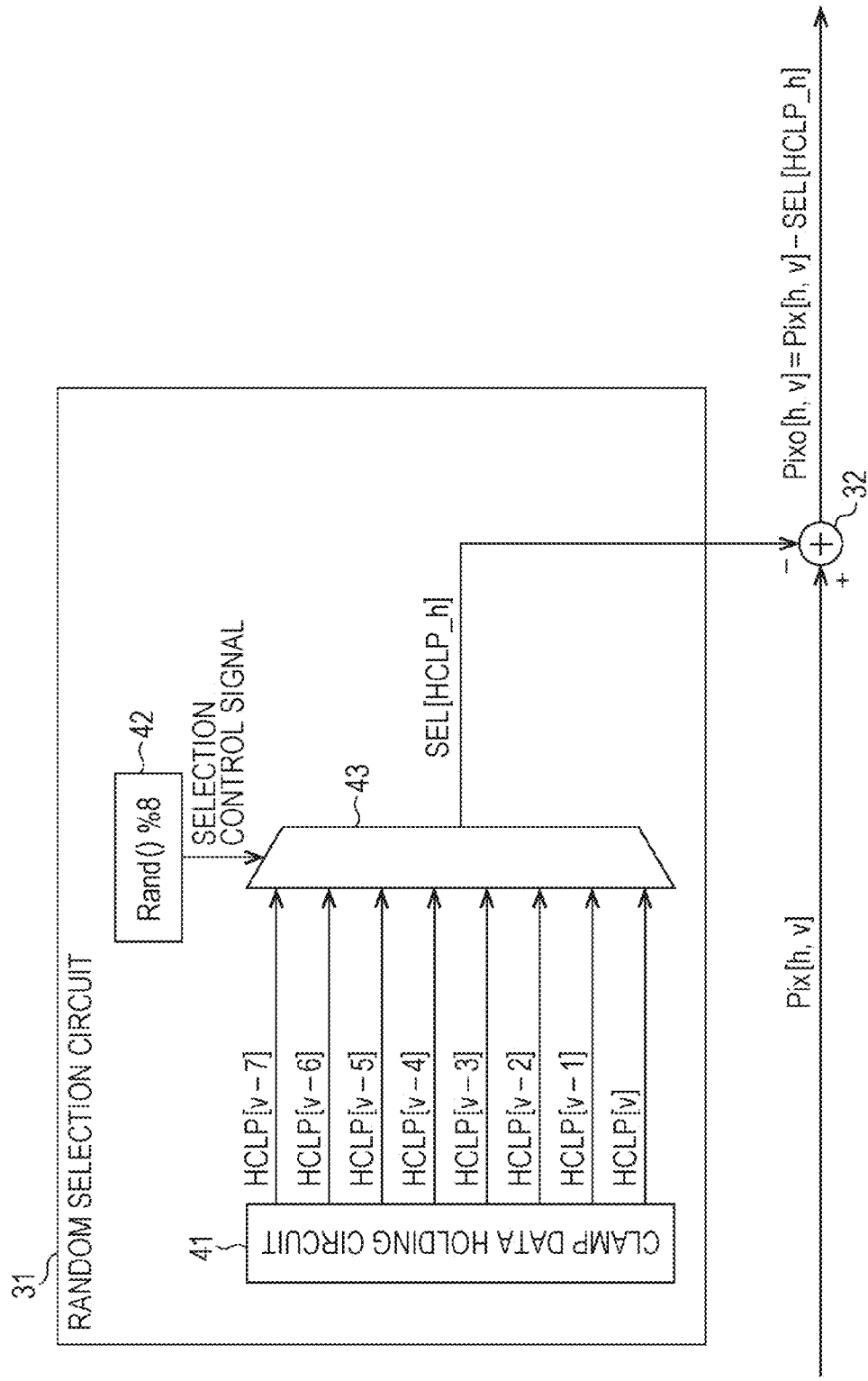

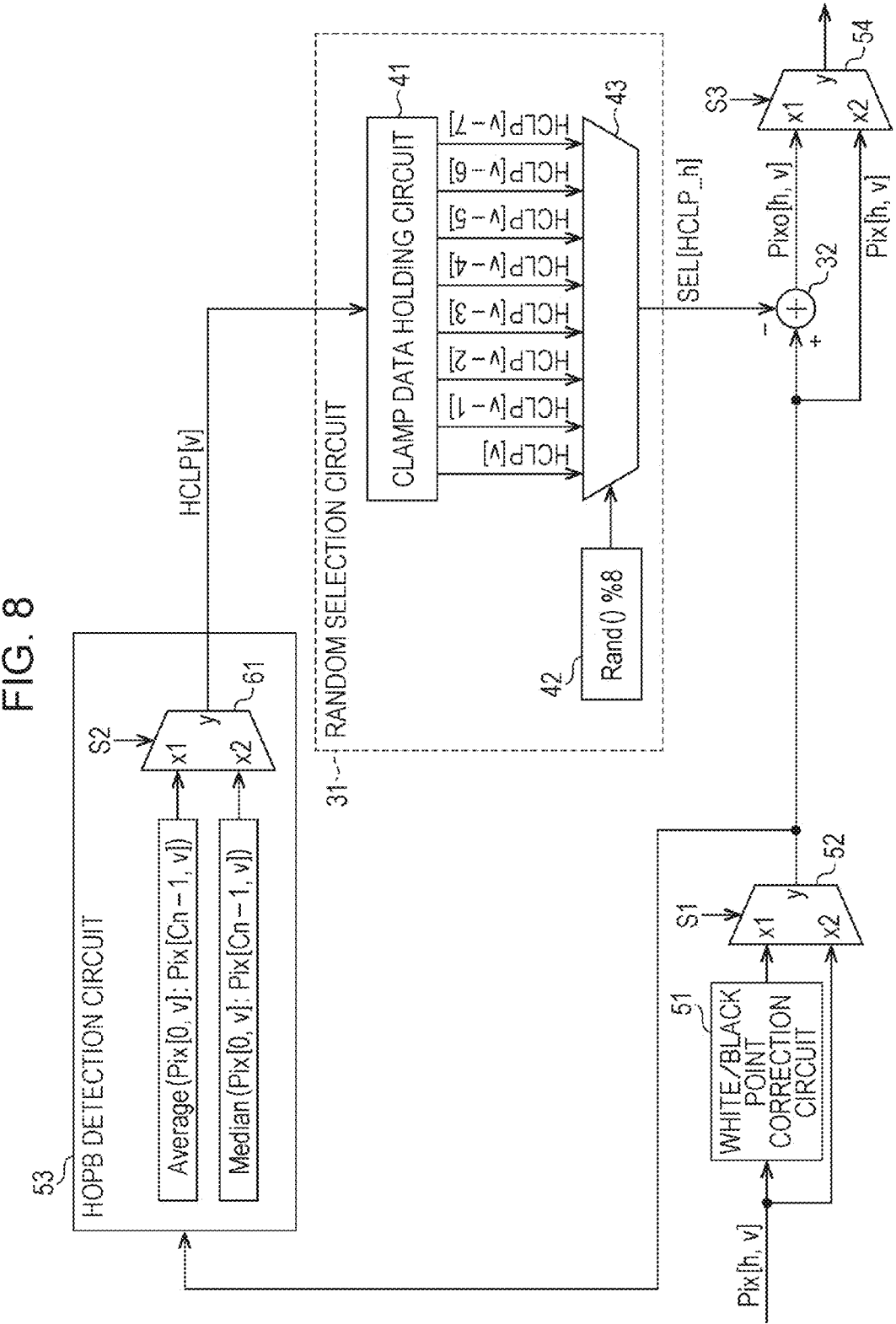

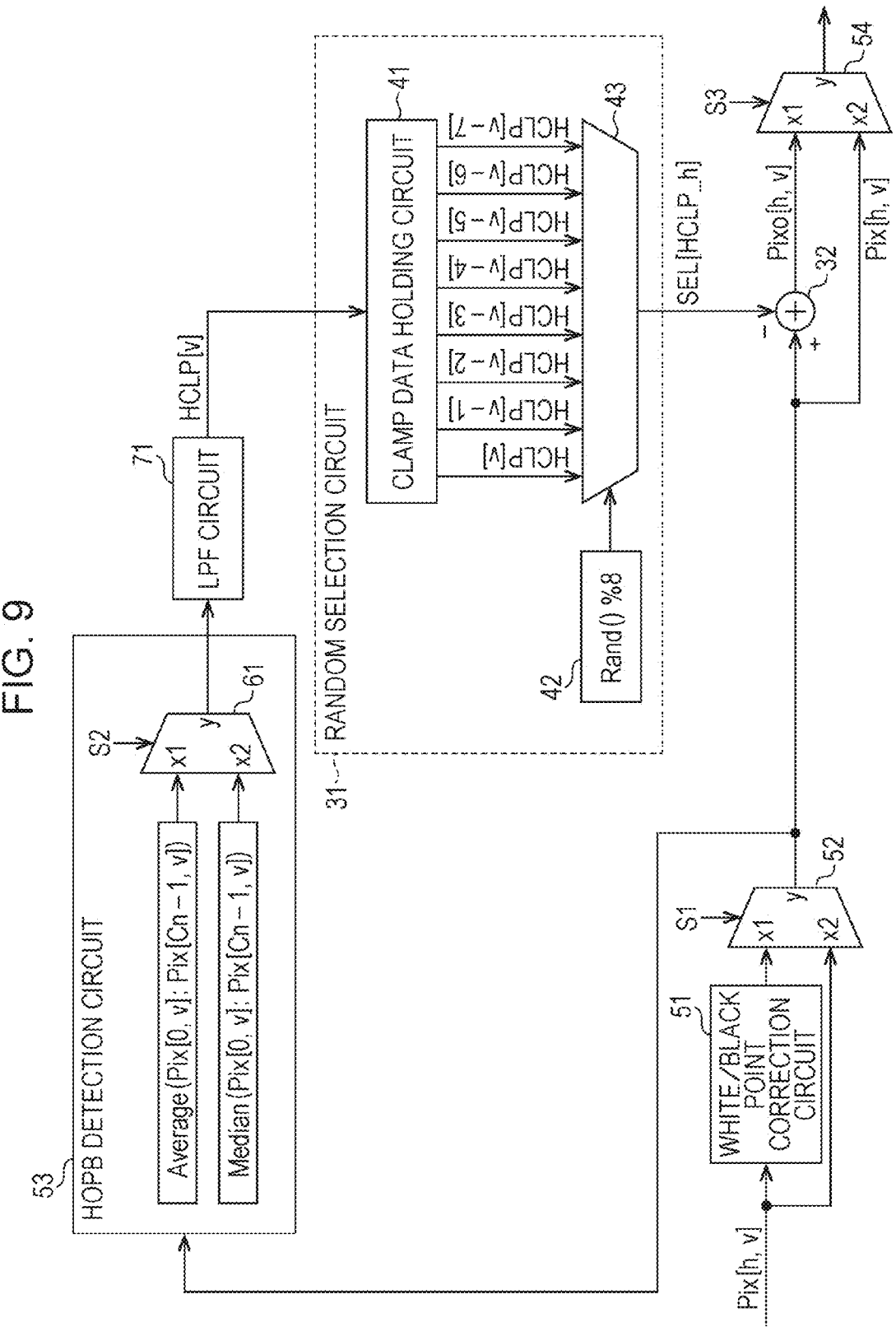

SOLID-STATE IMAGING DEVICE, SIGNAL PROCESSING METHOD THEREOF, AND ELECTRONIC APPARATUS

CROSS REFERENCE TO RELATED APPLICATIONS

This application claims the benefit of Japanese Priority Patent Application JP 2013-085481 filed Apr. 16, 2013, the entire contents of which are incorporated herein by reference.

BACKGROUND

The present technology relates to a solid-state imaging device, a signal processing method thereof, and an electronic apparatus, and particularly to a solid-state imaging device, a signal processing method thereof, and an electronic apparatus, capable of suppressing a horizontal line or a vertical line caused by random noise.

Dark shading due to a dark current component of a pixel or an in-surface distribution of the dark current, and a horizontal line or a vertical line caused by the fluctuation of a reading circuit or a power supply occur in an image sensor. Here, the dark current is a current which is generated by electric charge accumulated in a photodiode even if light is not incident thereto.

Therefore, in the image sensor, a part of a pixel array section is blocked from light, and a pixel signal of a pixel which is blocked from light is detected to be produced as a clamp value. The clamp value is subtracted from a pixel signal of an effective pixel portion which is not blocked from light, thereby performing a clamp process for correcting dark shading, a horizontal line, and a vertical line (for example, refer to Japanese Unexamined Patent Application Publication No. 2004-15712).

However, random noise is included in the pixel signal of the light-blocked pixel, and thus there is a problem in that a random horizontal line or vertical line occurs due to the influence of the random noise.

In order to suppress the random horizontal line or vertical line due to the influence of the random noise, there is a method in which the number of light-blocked pixels for detecting a clamp value is increased, and an average value or a median value of the plurality of pixels is calculated so as to be used as a clamp value. However, if the number of light-blocked pixels is increased, a disadvantage of increasing a chip size occurs.

Therefore, a method has been proposed in which an average value or a median value of light-blocked pixels of a plurality of rows or a plurality of columns is used as a clamp value without increasing the number of light-blocked pixels, thereby suppressing a random horizontal line or vertical line (for example, refer to Japanese Unexamined Patent Application Publication No. 2006-157263).

SUMMARY

However, in a case where a clamp value is calculated using the light-blocked pixels of a plurality of rows or a plurality of columns, correction followability to spatial high-frequency dark shading is damaged. In other words, noise which rapidly varies between adjacent rows or columns may not be corrected properly.

It is desirable to suppress a horizontal line or a vertical line caused by random noise.

According to an embodiment of the present technology, there is provided a solid-state imaging device including a pixel array section that includes a light-blocked pixel portion in which a plurality of pixels are arranged in a two-dimensional array form and a photoelectric conversion element included in each pixel is blocked from light, and an effective pixel portion which is not blocked from light; and a signal process circuit that processes a pixel signal output from each pixel of the pixel array section, in which the signal processing circuit calculates, as held data, a row statistic obtained by performing a statistical process on pixel signals of the light-blocked pixel portion in the unit of rows; holds the held data items of a plurality of rows including a process target row of the pixel array section; randomly selects one of the held data items of a plurality of rows; and subtracts the randomly selected held data item from a pixel signal of the pixel of the process target row in the effective pixel portion.

According to the embodiment of the present technology, there is provided a signal processing method of a solid-state imaging device provided with a pixel array section that includes a light-blocked pixel portion in which a plurality of pixels are arranged in a two-dimensional array form and a photoelectric conversion element included in each pixel is blocked from light, and an effective pixel portion which is not blocked from light; and a signal process circuit that processes a pixel signal output from each pixel of the pixel array section, the signal processing method including causing the signal processing circuit to calculate, as held data, a row statistic obtained by performing a statistical process on pixel signals of the light-blocked pixel portion in the unit of rows; hold the held data items of a plurality of rows including a process target row of the pixel array section; randomly select one of the held data items of a plurality of rows; and subtract the randomly selected held data item from a pixel signal of the pixel of the process target row in the effective pixel portion.

According to the embodiment of the present technology, there is provided an electronic apparatus including a solid-state imaging device provided with a pixel array section that includes a light-blocked pixel portion in which a plurality of pixels are arranged in a two-dimensional array form and a photoelectric conversion element included in each pixel is blocked from light, and an effective pixel portion which is not blocked from light; and a signal process circuit that processes a pixel signal output from each pixel of the pixel array section, in which the signal processing circuit calculates, as held data, a row statistic obtained by performing a statistical process on pixel signals of the light-blocked pixel portion in the unit of rows; holds the held data items of a plurality of rows including a process target row of the pixel array section; randomly selects one of the held data items of a plurality of rows; and subtracts the randomly selected held data item from a pixel signal of the pixel of the process target row in the effective pixel portion.

According to the embodiment of the present technology, in a signal processing circuit of a solid-state imaging device including a pixel array section that includes a light-blocked pixel portion in which a plurality of pixels are arranged in a two-dimensional array form and a photoelectric conversion element included in each pixel is blocked from light, and an effective pixel portion which is not blocked from light, and the signal process circuit that processes a pixel signal output from each pixel of the pixel array section, a row statistic obtained by performing a statistical process on pixel signals of the light-blocked pixel portion in the unit of rows is calculated as held data, the held data items of a plurality of rows including a process target row of the pixel array section are held, one of the held data items of a plurality of rows is randomly selected, and the randomly selected held data item is subtracted from a pixel signal of the pixel of the process target row in the effective pixel portion.

According to another embodiment of the present technology, there is provided a solid-state imaging device including a pixel array section that includes a light-blocked pixel portion in which a plurality of pixels are arranged in a two-dimensional array form and a photoelectric conversion element included in each pixel is blocked from light, and an effective pixel portion which is not blocked from light; and a signal process circuit that processes a pixel signal output from each pixel of the pixel array section, in which the signal processing circuit calculates, as held data, a column statistic obtained by performing a statistical process on pixel signals of the light-blocked pixel portion in the unit of columns; holds the held data items of a plurality of columns including a process target column of the pixel array section; randomly selects one of the held data items of a plurality of columns; and subtracts the randomly selected held data item from a pixel signal of the pixel of the process target column in the effective pixel portion.

According to the embodiment of the present technology, there is provided a signal processing method of a solid-state imaging device provided with a pixel array section that includes a light-blocked pixel portion in which a plurality of pixels are arranged in a two-dimensional array form and a photoelectric conversion element included in each pixel is blocked from light, and an effective pixel portion which is not blocked from light; and a signal process circuit that processes a pixel signal output from each pixel of the pixel array section, the signal processing method including causing the signal processing circuit to calculate, as held data, a column statistic obtained by performing a statistical process on pixel signals of the light-blocked pixel portion in the unit of columns; hold the held data items of a plurality of columns including a process target column of the pixel array section; randomly select one of the held data items of a plurality of columns; and subtract the randomly selected held data item from a pixel signal of the pixel of the process target column in the effective pixel portion.

According to the embodiment of the present technology, there is provided an electronic apparatus including a solid-state imaging device provided with a pixel array section that includes a light-blocked pixel portion in which a plurality of pixels are arranged in a two-dimensional array form and a photoelectric conversion element included in each pixel is blocked from light, and an effective pixel portion which is not blocked from light; and a signal process circuit that processes a pixel signal output from each pixel of the pixel array section, in which the signal processing circuit calculates, as held data, a column statistic obtained by performing a statistical process on pixel signals of the light-blocked pixel portion in the unit of columns; holds the held data items of a plurality of columns including a process target column of the pixel array section; randomly selects one of the held data items of a plurality of columns; and subtracts the randomly selected held data item from a pixel signal of the pixel of the process target column in the effective pixel portion.

According to the embodiment of the present technology, in a signal processing circuit of a solid-state imaging device including a pixel array section that includes a light-blocked pixel portion in which a plurality of pixels are arranged in a two-dimensional array form and a photoelectric conversion element included in each pixel is blocked from light, and an effective pixel portion which is not blocked from light, and the signal process circuit that processes a pixel signal output from each pixel of the pixel array section, a column statistic obtained by performing a statistical process on pixel signals of the light-blocked pixel portion in the unit of columns is calculated as held data, the held data items of a plurality of columns including a process target column of the pixel array section are held, one of the held data items of a plurality of columns is randomly selected, and the randomly selected held data item is subtracted from a pixel signal of the pixel of the process target column in the effective pixel portion.

The solid-state imaging device and the electronic apparatus may be respectively stand-alone device and apparatus, and may be modules of being incorporated into other devices and apparatuses, respectively.

According to the embodiments of the present technology, it is possible to suppress a horizontal line or a vertical line caused by random noise.

BRIEF DESCRIPTION OF THE DRAWINGS

FIG. 1 is a block diagram illustrating a schematic configuration example of a solid-state imaging device to which the present technology is applied;

FIG. 2 is a diagram illustrating a configuration example of a pixel array section;

FIG. 3 is a diagram illustrating a horizontal clamp process of the related art;

FIG. 4 is a diagram illustrating the horizontal clamp process of the related art;

FIG. 5 is a diagram illustrating an outline of a horizontal clamp process performed by a signal processing circuit;

FIG. 7 is a block diagram illustrating a main part of the signal processing circuit;

FIG. 8 is a block diagram illustrating a first embodiment of the signal processing circuit;

FIG. 9 is a block diagram illustrating a second embodiment of the signal processing circuit;

DETAILED DESCRIPTION OF EMBODIMENTS

Figure 6A:
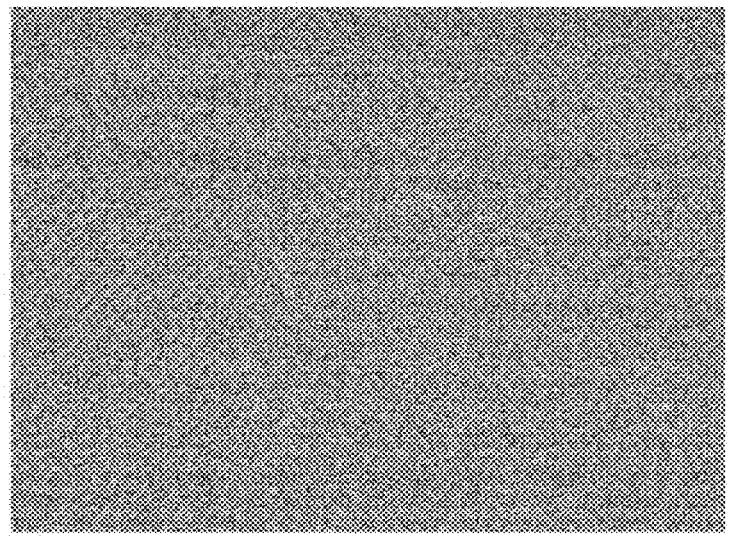
FIGS. 6A and 6B are diagrams illustrating an example of a result of comparison with the method of the related art.

Hereinafter, embodiments of the present technology will be described. In addition, the description will be made in the following order.

1. Schematic configuration example of solid-state imaging device
2. First embodiment of signal processing circuit
3. Second embodiment of signal processing circuit
4. Third embodiment of signal processing circuit
5. Fourth embodiment of signal processing circuit
6. Fifth embodiment of signal processing circuit
7. Sixth embodiment of signal processing circuit
8. Configuration example of electronic apparatus Schematic configuration example of solid-state imaging device FIG. 1 illustrates a schematic configuration of a solid-state imaging device to which the present technology is applied.

A solid-state imaging device 1 of FIG. 1 includes a pixel array section 3 in which pixels 2 are arranged in a two-dimensional array form on a semiconductor substrate 13 which uses, for example, silicon (Si) as a semiconductor, and a peripheral circuit section on the periphery thereof. The peripheral circuit section includes a vertical driving circuit 4, a column signal processing circuit 5, a horizontal driving circuit 6, a buffer circuit 7, a control circuit 8, and the like.

The pixel 2 includes a photodiode which is a photoelectric conversion element and a plurality of pixel transistors. The plurality of pixel transistors are, MOS transistors such as, for example, a transmission transistor, an amplification transistor, a selection transistor, and a reset transistor. A configuration example of the pixel 2 will be described later with reference to FIG. 14.

The pixel array section 3 includes, as illustrated in FIG. 2, an effective pixel portion 21 in which pixels of which the photoelectric conversion elements are not blocked from light are arranged, and an optical black portion 22 (hereinafter, referred to as an OPB portion 22) as a light-blocked pixel portion in which pixels of which the photoelectric conversion elements are blocked from light so as to detect a level (black level) in darkness are arranged. The OPB portion 22 includes an HOPE region which is arranged in a horizontal direction (row direction) with respect to the effective pixel portion 21, and a VOPB region which is arranged in a vertical direction (column direction) with respect thereto.

Referring to FIG. 1 again, the control circuit 8 receives an input clock and data for commanding an operation mode or the like, and outputs data such as internal information of the solid-state imaging device 1. In other words, the control circuit 8 generates a clock signal or a control signal which is used as a reference of operations of the vertical driving circuit 4, the column signal processing circuit 5, the horizontal driving circuit 6, and the like, on the basis of a vertical synchronization signal, a horizontal synchronization signal, and a master clock. In addition, the control circuit 8 outputs the generated clock signal or control signal to the vertical driving circuit 4, the column signal processing circuit 5, the horizontal driving circuit 6, and the like.

The vertical driving circuit 4 includes, for example, shift registers, selects a pixel driving wiring 10, and supplies a pulse for driving the pixels 2 to the selected pixel driving wiring 10 so as to drive the pixels 2 row by row. In other words, the vertical driving circuit 4 selectively scans the respective pixels 2 of the pixel array section 3 in order in the vertical direction row by row so that a pixel signal based on signal charge which is generated in proportion to a light receiving amount in the photoelectric conversion element of each pixel 2 is supplied to the column signal processing circuit 5 through a vertical signal line 9.

The column signal processing circuits 5 are disposed in every column of the pixels 2, and perform signal processing such as noise removal on signals of one row which are output from the pixels 2 for each pixel row. For example, the column signal processing circuits 5 perform signal processes such as correlated double sampling (CDS) and AD conversion for removing fixed pattern noise unique to the pixels.

The horizontal driving circuit 6 includes, for example, shift registers, and sequentially outputs a horizontal scanning pulse so as to sequentially select the column signal processing circuits 5 one by one, thereby outputting a pixel signal to a horizontal signal line 11 from each of the column signal processing circuits 5.

The buffer circuit 7 buffers the signals which are supplied in order, from the respective column signal processing circuits 5 via the horizontal signal line 11, for outputting to the signal processing circuit 12.

The signal processing circuit 12 performs a variety of digital signal processes on the digital pixel signal supplied from the buffer circuit 7. In the present embodiment, in the signal processing circuit 12, at least a clamp process is performed in order to correct a black level offset due to a dark current, dark shading caused by influence or the like of in-surface dependency of the dark current or fluctuation of a power supply. The signal processing circuit 12 may perform other digital signal processes such as, for example, correction of a column variation. The signal processing circuit 12 outputs the pixel signal having undergone the clamp process to a processing circuit (not illustrated) on the subsequent stage.

The solid-state imaging device 1 configured in this way is a CMOS image sensor of a column AD type in which the column signal processing circuit 5 which performs the CDS process and the AD conversion process is disposed in every column of the pixels.

The solid-state imaging device 1 performs a clamp process for suppressing a random horizontal line or vertical line due to influence of random noise included in the pixel signal of the OPB portion 22 in the signal processing circuit 12. Therefore, the details of the clamp process performed by the signal processing circuit 12 will be described.

Hereinafter, a detailed description will be made of a horizontal clamp process in which the signal processing circuit 12 performs a clamp process in the unit of pixel rows in the horizontal direction so as to correct a random horizontal line, or shading in the vertical direction. However, if the processing unit is changed from the unit of pixel rows in the horizontal direction to the unit of pixel columns in the vertical direction, the present technology is also applicable to a vertical clamp process for correcting a random vertical line and shading in the horizontal direction. Description of horizontal clamp process of the related art First, with reference to FIGS. 3 and 4, a horizontal clamp process of the related art will be described.

FIG. 3 is a diagram illustrating dark shading in the vertical direction which occurs in the pixel array section 3.

FIG. 3 illustrates an HOPE region output signal P1 which is a pixel signal output from a predetermined pixel column passing through the HOPE region of the pixel array section 3, and an effective pixel output signal P2 which is a pixel signal output from a predetermined pixel column passing through the effective pixel portion 21 of the pixel array section 3.

In addition, in FIG. 3, it is assumed that uniform light is incident to the effective pixel portion 21 of the pixel array section 3.

The OPB portion 22 including the HOPE region and the VOPB region is blocked from light. For this reason, the HOPE region output signal P1 is an unnecessary signal which is generated by an influence or the like of in-surface distribution of a dark current or fluctuation of a power supply. This unnecessary signal is also generated in each pixel of the effective pixel portion 21 of the pixel array section 3 in the same manner, and thus the effective pixel output signal P2 shows the same signal distribution as the HOPE region output signal P1.

However, the uniform light is incident to the effective pixel portion 21 of the pixel array section 3, and thus the effective pixel output signal P2 is not a signal based on an amount of light which is originally received by each pixel. A signal which is originally received by each pixel of the effective pixel portion 21 is a signal (P2-P1), indicated by the broken line in FIG. 3, obtained by subtracting the HOPE region output signal P1 from the effective pixel output signal P2. The horizontal clamp process is a process of acquiring a signal (P2-P1) obtained by subtracting the HOPE region output signal P1 from the effective pixel output signal P2, thereby removing a dark current level difference or a dark shading component.

A horizontal clamp process of the related art will be described with reference to FIG. 4.

FIG. 4 illustrates an example of a horizontal clamp process on a pixel signal Pix[h,v] at a pixel position [h,v] in the horizontal direction [h] and the vertical direction [v] of the effective pixel portion 21.

In the horizontal clamp process, first, a detection process is performed in which a clamp value HCLP[v] of the pixel row [v] is detected using pixel signals of a plurality of pixels of the pixel row [v] in the HOPE region.

Specifically, as illustrated in FIG. 4, if the number of pixels of the pixel row [v] in the HOPE region is Cn, an average value HOPBA[v] of pixel signals Pix[0,v] to Pix[Cn−1,v] of the Cn pixels at the pixel positions [0,v] to [Cn−1,v] in the HOPE region is Average(Pix[0,v], . . . , Pix[Cn−1,v]), and this is obtained as a clamp value HCLP[v] of the pixel row [v].

Alternatively, a median value HOPBM[v] of pixel signals Pix[0,v] to Pix[Cn−1,v] of the Cn pixels is Median (Pix[0,v], . . . , Pix[Cn−1,v]), and this is obtained as a clamp value HCLP[v] of the pixel row [v].

Next, the obtained clamp value HCLP[v] is subtracted from the pixel signal Pix[h,v] at the pixel position [h,v] of the effective pixel portion 21, and thus an original pixel signal Pixo[h,v]=Pix[h,v]-HCLP[v] from which a dark shading component is removed is obtained.

However, in this horizontal clamp process of the related art, when a random noise component included in the pixel signal of the HOPE region is not removed, a value deviated from the value which is supposed to be originally corrected is used as a clamp value HCLP[v], and thus a correction error occurs.

In order to remove such a correction error, in the related art, as described in the Background, a method is employed in which the number Cn of pixels of the HOPE region is increased, an average value of a plurality of rows is obtained as a clamp value, or the like. However, in this method, a disadvantage of increasing a chip size or damaging followability of clamp occurs.

Outline of Clamp Process in Signal Processing Circuit 12

Therefore, the signal processing circuit 12 realizes a clamp process for suppressing the occurrence of a random horizontal line without causing such a disadvantage.

With reference to FIG. 5, an outline of a horizontal clamp process performed by the signal processing circuit 12 will be described.

In a case where a pixel row which is a process target on which the clamp process is performed is a pixel row [v], the signal processing circuit 12 obtains a clamp value HCLP[v] of the pixel row [v] by using pixel signals Pix[0,v] to Pix[Cn−1,v] of the Cn pixels of the pixel row [v] in the HOPE region.

In addition, the signal processing circuit 12 also stores and holds clamp values of a plurality of rows which are calculated hitherto through the clamp process. FIG. 5 illustrates an example in which the signal processing circuit 12 holds clamp values HCLP[v−7] to HCLP[v] of eight rows including the pixel row [v] which is a process target.

The signal processing circuit 12 randomly selects any one of the held clamp values HCLP[v−7] to HCLP[v] of eight rows in relation to each pixel of the effective pixel portion 21 of the pixel row [v]. In addition, the signal processing circuit 12 subtracts the randomly selected clamp value from a pixel signal of the pixel of the pixel row [v] of the effective pixel portion 21, so as to obtain an original pixel signal from which a dark shading component is removed.

In the example of FIG. 5, for example, at a pixel position [Cn,v], the signal processing circuit 12 selects the clamp value HCLP[v−1] of the pixel row [v−1] which is a previous row of the pixel row [v], and subtracts the clamp value HCLP [v−1] from the pixel signal Pix[Cn,v] so as to obtain an original pixel signal Pixo[Cn,v]=Pix[Cn,v]-HCLP[v−1].

In addition, for example, at a pixel position [Cn+1,v], the signal processing circuit 12 selects the clamp value HCLP[v−4] of the pixel row [v−4] which is the fourth previous row of the pixel row [v], and subtracts the clamp value HCLP[v−4] from the pixel signal Pix[Cn+1,v] so as to obtain an original pixel signal Pixo[Cn+1,v]=Pix[Cn+1,v]-HCLP[v−4].

Similarly, at a pixel position [Cn+2,v], the signal processing circuit 12 selects the clamp value HCLP[v] of the pixel row [v], and subtracts the clamp value HCLP[v] from the pixel signal Pix[Cn+2,v] so as to obtain an original pixel signal Pixo[Cn+2,v]=Pix[Cn+2,v]-HCLP[v].

In FIG. 5, the clamp value described in each pixel of the effective pixel portion 21 of the pixel row [v] which is a clamp process target row indicates a randomly selected clamp value which is subtracted from a pixel signal of each pixel of the effective pixel portion 21.

As mentioned above, when performing the clamp process, the signal processing circuit 12 randomly selects and subtracts any one of the held clamp values HCLP[v−7] to HCLP [v] of a plurality of rows (eight rows) as a clamp value, so as to distribute a random error (random noise suppression remainder) of the clamp value of the HOPE region in the column direction. Accordingly, it is possible to prevent the random noise suppression remainder from being uniformly included in the same row and to thus suppress a random horizontal line.

Figure 6B:
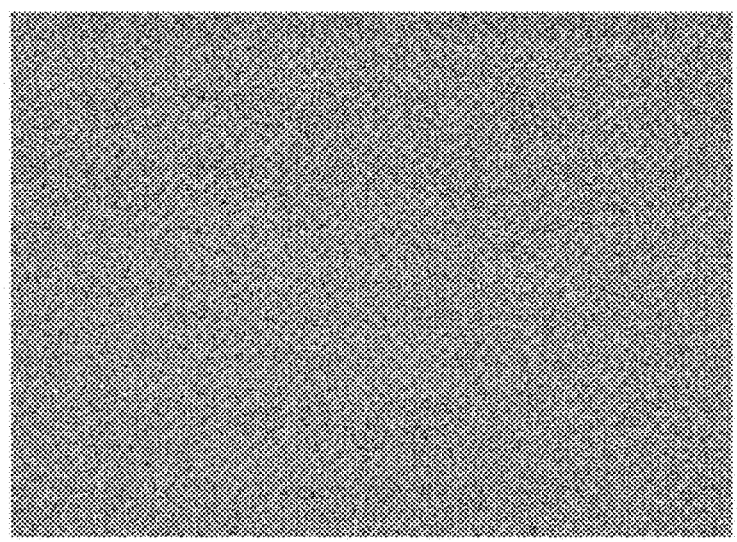

FIGS. 6A and 6B illustrate a comparison result between the process of the related art and the process performed by the signal processing circuit 12.

FIG. 6A illustrates a process result of the horizontal clamp process of the related art in which an average value of eight rows is obtained as a clamp value and is subtracted. FIG. 6B illustrates a process result of the horizontal clamp process performed by the signal processing circuit 12.

It can be seen that a random horizontal line is generated in an image of FIG. 6A according to the method of the related art, but a random horizontal line is suppressed in an image of FIG. 6B. Therefore, in the method of the related art of obtaining an average value of a plurality of rows as a clamp value, it is necessary to average clamp values of the number of rows larger than eight rows in order to suppress the random horizontal line, but, in the present technology using the signal processing circuit 12, the random horizontal line can be suppressed even with the number of rows smaller than in the method of the related art, and thus it is possible to further handle spatial high-frequency random noise than in the method of the related art.

Description of Main Part of Signal Processing Circuit 12 for Clamp Process

FIG. 7 illustrates a block diagram of a main part of the signal processing circuit 12 which realizes the above-described horizontal clamp process.

The signal processing circuit 12 includes a random selection circuit 31 and an operator 32.

The random selection circuit 31 includes a clamp data holding circuit 41, a control circuit 42, and a selector 43.

In a case where a clamp process target row is the pixel row [v], the clamp data holding circuit 41 holds clamp values HCLP[v−7] to HCLP[v] of eight rows including the present pixel row [v], for supply to the selector 43. The respective pixel rows of the pixel array section 3 sequentially become a clamp process target in the vertical direction, and, in the clamp data holding circuit 41, the oldest clamp value is erased when a clamp value of a new pixel row is input thereto.

The control circuit 42 randomly selects any one of the clamp values HCLP[v−7] to HCLP[v] of eight rows which are supplied from the clamp data holding circuit 41 to the selector 43, in the unit of pixels of a process target row. In addition, the control circuit 42 supplies a selection control signal indicating the selected clamp value to the selector 43. "Rand( )%8" of FIG. 7 indicates a process in which any one of the clamp values HCLP[v−7] to HCLP[v] of eight rows is randomly selected.

The selector 43 selects any one of the clamp values HCLP[v−7] to HCLP[v] of eight rows supplied from the clamp data holding circuit 41 on the basis of the selection control signal supplied from the control circuit 42. The selector 43 outputs the clamp value selected on the basis of the selection control signal, to the operator 32 as the selected clamp value SEL[HCLP_h], in relation to a pixel at the horizontal position [h] of the process target pixel row [v].

To the operator 32, the selected clamp value SEL[HCLP_h] is input from the selector 43 of the random selection circuit 31, and the pixel signal Pix[h,v] read from the pixel position [h,v] of the effective pixel portion 21 is also input.

The operator 32 subtracts the selected clamp value SEL[HCLP_h] from the pixel signal Pix[h,v] at the pixel position [h,v] of the effective pixel portion 21 so as to generate and output a pixel signal Pixo[h,v]=Pix[h,v]-SEL[HCLP_h] having undergone the clamp process.

First Embodiment of Signal Processing Circuit 12

FIG. 8 is a block diagram illustrating an overall configuration example of the signal processing circuit 12 realizing the above-described horizontal clamp process and a first embodiment of the signal processing circuit 12.

In addition, in FIG. 8, the same constituent elements as in FIG. 7 described above are given the same reference numerals, and thus, the description thereof will not be repeated.

The signal processing circuit 12 includes the random selection circuit 31 and the operator 32 described in FIG. 7, a white/black point correction circuit 51, a selector 52, an HOPE detection circuit 53, and a selector 54.

The white/black point correction circuit 51 is a correction circuit which corrects a pixel signal representing a white point or a black point in order to increase reliability of calculation of a clamp value.

For example, in a case where the input pixel signal Pix[h,v] at the pixel position [h,v] has a signal level which is smaller than a first threshold value TH1 or equal to or higher than a second threshold value TH2 (TH1<TH2), the white/black point correction circuit 51 replaces the pixel signal with a pixel signal with a predetermined black level set in advance, for outputting to the selector 52. In a case where the input pixel signal Pix[h,v] at the pixel position [h,v] has a signal level which is equal to or higher than the first threshold value TH1 and smaller than the second threshold value TH2, the input pixel signal Pix[h,v] is output to the selector 52 without replacement.

The selector 52 selects an input x1 or an input x2 on the basis of a supplied control signal S1, and outputs the selected input from an output y. The control signal S1 for selecting the input x1 is supplied to the selector 52 if the pixel position [h,v] is located in the HOPE region, and the control signal S1 for selecting the input x2 is supplied thereto if the pixel position [h,v] is located in the effective pixel portion 21.

Therefore, the selector 52 selects and outputs the pixel signal Pix[h,v] having undergone the white/black point correction process if the pixel position [h,v] is located in the HOPE region, and selects and outputs the pixel signal Pix[h,v] without replacement, which is read from the effective pixel portion 21, if the pixel position [h,v] is located in the effective pixel portion 21.

The HOPE detection circuit 53 holds only pixel signals Pix[0,v] to Pix[Cn−1,v] of the Cn pixels in the HOPE region among the pixel signals Pix[h,v] of the pixel row [v] which are sequentially output from the selector 52, and calculates a clamp value HCLP[v] of the pixel row [v].

Specifically, the HOPE detection circuit 53 calculates an average value HOPBA[v]=Average(Pix[0,v], . . . , Pix[Cn−1,v]) and a median value HOPBM[v]=Median(Pix[0,v], . . . , Pix[Cn−1,v]) of pixel signals Pix[0,v] to Pix[Cn−1,v] of the Cn pixels. In addition, a selector 61 selects either of the average value HOPBA[v] and the median value HOPBM[v] on the basis of a control signal S2, and supplies the selected value to the clamp data holding circuit 41 of the random selection circuit 31 from the HOPE detection circuit 53 as the clamp value HCLP[v] of the pixel row [v].

The clamp data holding circuit 41 of the random selection circuit 31, as described above, holds the clamp values HCLP[v−7] to HCLP[v] of eight rows including the clamp value HCLP[v] of the process target pixel row [v], supplied from the HOPE detection circuit 53.

The selector 43 randomly selects any one of the clamp values HCLP[v−7] to HCLP[v] on the basis of the selection control signal from the control circuit 42, for outputting to the operator 32 as the selected clamp value SEL[HCLP_h].

The operator 32 subtracts the selected clamp value SEL[HCLP_h] supplied from the random selection circuit 31, from the pixel signal Pix[h,v] supplied from the selector 52, and outputs a pixel signal Pixo[h,v]=Pix[h,v]-SEL[HCLP_h] obtained as a result thereof, to the selector 54.

The selector 54 selects an input x1 or an input x2 on the basis of a supplied control signal S3, and outputs the selected input from an output y. The control signal S3 for selecting the input x1 is supplied to the selector 54 if the pixel position [h,v] is located in the effective pixel portion 21, and the control signal S3 for selecting the input x2 is supplied thereto if the pixel position [h,v] is located in the HOPE region.

Therefore, the selector 54 selects and outputs the pixel signal Pixo[h,v] which is a signal output from the operator 32 and having undergone the clamp process if the pixel position [h,v] is located in the effective pixel portion 21. On the other hand, the selector 54 selects and outputs the pixel signal Pix[h,v] which is a signal output from the selector 52 and having undergone the white/black point correction process, if the pixel position [h,v] is located in the HOPE region.

A control unit which outputs the control signals S1 to S3 may be provided in the signal processing circuit 12 or outside the signal processing circuit 12. In addition, the control circuit 42 may output the control signals S1 to S3.

Next, a description will be made of an operation (process) of the signal processing circuit 12 in the process target pixel row [v].

First, a description will be made of an operation when the pixel position [h,v] is located in the HOPE region.

When the pixel position [h,v] is located in the HOPE region, the pixel signal Pix[h,v] having undergone the white/ black point correction process is selected by the selector 52, and is output to the HOPE detection circuit 53, the operator 32, and the selector 54.

When the pixel position [h,v] is located in the HOPE region, the HOPE detection circuit 53 accumulates the pixel signals Pix[h,v] which are sequentially output from the selector 52, and calculates the clamp value HCLP[v] of the pixel row [v] at the time when the pixel signals Pix[0,v] to Pix[Cn−1,v] of the Cn pixels in the HOPE region are accumulated, so as to output the calculated clamp value to the random selection circuit 31.

In addition, when the pixel position [h,v] is located in the HOPE region, the selector 54 selects and outputs the pixel signal Pix[h,v] from the selector 52, that is, the pixel signal Pix[h,v] having undergone the white/black point correction process, on the basis of the control signal S3.

Next, if the pixel position [h,v] is located in the effective pixel portion 21, the selector 52 selects the input pixel signal Pix[h,v] itself at the pixel position [h,v] on the basis of the control signal S1, and outputs the selected signal to the HOPE detection circuit 53, the operator 32, and the selector 54.

In synchronization with the timing when the selector 52 outputs the pixel signal Pix[h,v] at the pixel position [h,v] to the operator 32, the random selection circuit 31 randomly selects any one of the clamp values HCLP[v−7] to HCLP[v] and outputs the selected value to the operator 32 as the selected clamp value SEL[HCLP_h].

The operator 32 subtracts the selected clamp value SEL [HCLP_h] supplied from the random selection circuit 31, from the pixel signal Pix[h,v] supplied from the selector 52, and thus calculates the pixel signal Pixo[h,v] which undergoes the clamp process by using the selected clamp value SEL[HCLP_h] so as to output the pixel signal Pixo[h,v] to the selector 54.

When the pixel position [h,v] is located in the effective pixel portion 21, the selector 54 selects and outputs the pixel signal Pixo[h,v] output from the operator 32 and having undergone the clamp process.

The signal processing circuit 12 is operated as above.

As described above, according to the signal processing circuit 12 of the first embodiment, the held clamp values HCLP[v−7] to HCLP[v] of a plurality of rows are randomly selected, and are subtracted from the pixel signal Pix[h,v] of each pixel of the effective pixel portion 21 of the process target pixel row [v], thereby distributing a random error (random noise suppression remainder) of the clamp value of the HOPE region in the column direction. Accordingly, it is possible to prevent the random noise suppression remainder from being uniformly included in the same row and to thus suppress a random horizontal line.

Second Embodiment of Signal Processing Circuit 12

FIG. 9 is a block diagram illustrating a second embodiment of the signal processing circuit 12.

In FIG. 9, the parts corresponding to the first embodiment of FIG. 8 are given the same reference numerals, and thus, the description thereof will not be repeated.

In the second embodiment, in comparison with the above-described first embodiment, an LPF circuit (a low-pass filter circuit) 71 is additionally provided between the HOPE detection circuit 53 and the random selection circuit 31.

The LPF circuit 71 holds the clamp values HCLP[v] of a plurality of rows, which are sequentially output from the HOPE detection circuit 53, and calculates an average value of the latest clamp values of a plurality of rows including the process target pixel row [v]. In addition, the LPF circuit 71 outputs the average value of the clamp values of the plurality of rows obtained through the calculation, to the random selection circuit 31 as a clamp value HCLP[v] of the process target pixel row [v].

The LPF circuit 71 may be configured to function as a low-pass filter, and may be formed by, for example, an IIR filter or the like.

Other configurations and operations according to the second embodiment are the same as the ones in the above-described first embodiment.

Third Embodiment of Signal Processing Circuit 12

Figure 10:
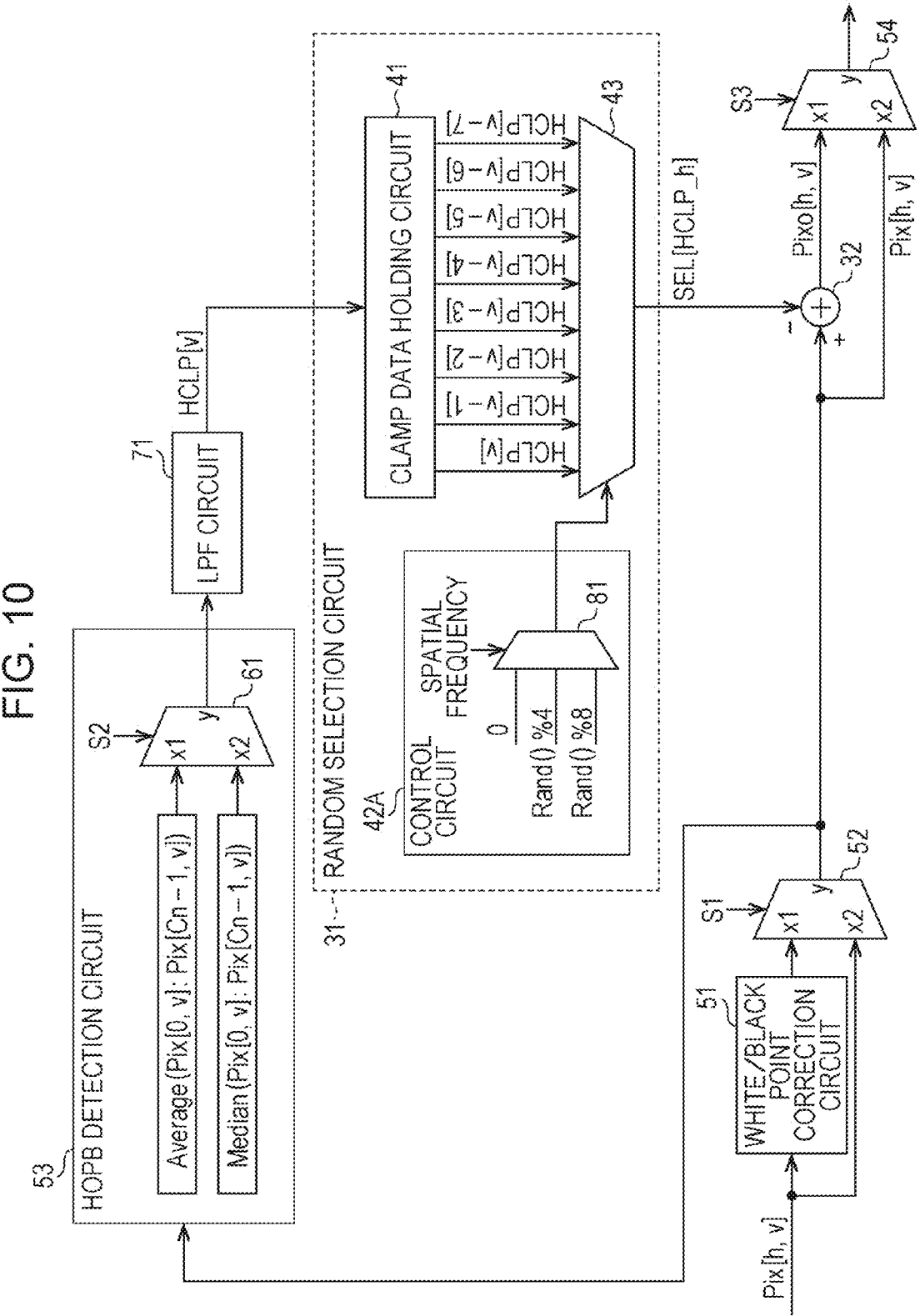
FIG. 10 is a block diagram illustrating a third embodiment of the signal processing circuit.

FIG. 10 is a block diagram illustrating a third embodiment of the signal processing circuit 12.

In FIG. 10, parts corresponding to the second embodiment of FIG. 9 are given the same reference numerals, and thus, the description thereof will not be repeated.

In the third embodiment, in comparison with the above-described second embodiment, a control circuit 42A is provided instead of the control circuit 42 in the random selection circuit 31.

The control circuit 42 according to the first and second embodiments supplies the selection control signal for randomly selecting any one of the held clamp values HCLP[v−7] to HCLP[v] of eight rows, to the selector 43.

In contrast, the control circuit 42A detects a spatial frequency of the HOPE region around the pixel row [v] which is a clamp process target, and changes the number of rows to be randomly selected based on the detected spatial frequency.

Specifically, the control circuit 42A includes a selector 81, and a result of detecting a spatial frequency of the HOPE region around the pixel row [v] is input to the selector 81. The selector 81 classifies the input spatial frequency into, for example, three levels, and selects any one of "0", "four rows", and "eight rows", as the number of rows to be randomly selected, on the basis of the classification result.

In a case where the input spatial frequency is included in the first level which is the highest frequency, the selector 81 selects "0" as the number of rows to be randomly selected, and supplies a selection control signal for selecting the clamp value HCLP[v] of the process target pixel row [v], to the selector 43.

In a case where the input spatial frequency is included in the second level lower than the first level, the selector 81 selects "four rows" as the number of rows to be randomly selected, randomly selects one clamp value from the latest clamp values HCLP[v−3] to HCLP[v] of four rows among the held clamp values HCLP[v−7] to HCLP[v] of eight rows, and supplies a selection control signal indicating the selected clamp value to the selector 43.

In a case where the input spatial frequency is included in the third level which is the lowest frequency, the selector 81 selects "eight rows" as the number of rows to be randomly selected, randomly selects any one of the held clamp values HCLP[v−7] to HCLP[v] of eight rows, and supplies a selection control signal indicating the selected clamp value to the selector 43.

As above, the selector 81 reduces the number of rows to be randomly selected as a spatial frequency of the HOPE region around the pixel row [v] varies to a high frequency, so as to improve the followability of the clamp.

Other configurations and operations according to the third embodiment are the same as the ones in the above-described other embodiments.

Although a description has been made of an example in which the input spatial frequency is classified into three levels, and the number of rows to be randomly selected is selected from three kinds, options of the number of rows to be randomly selected may be further increased, and may be two kinds.

Fourth Embodiment of Signal Processing Circuit 12

Figure 11:
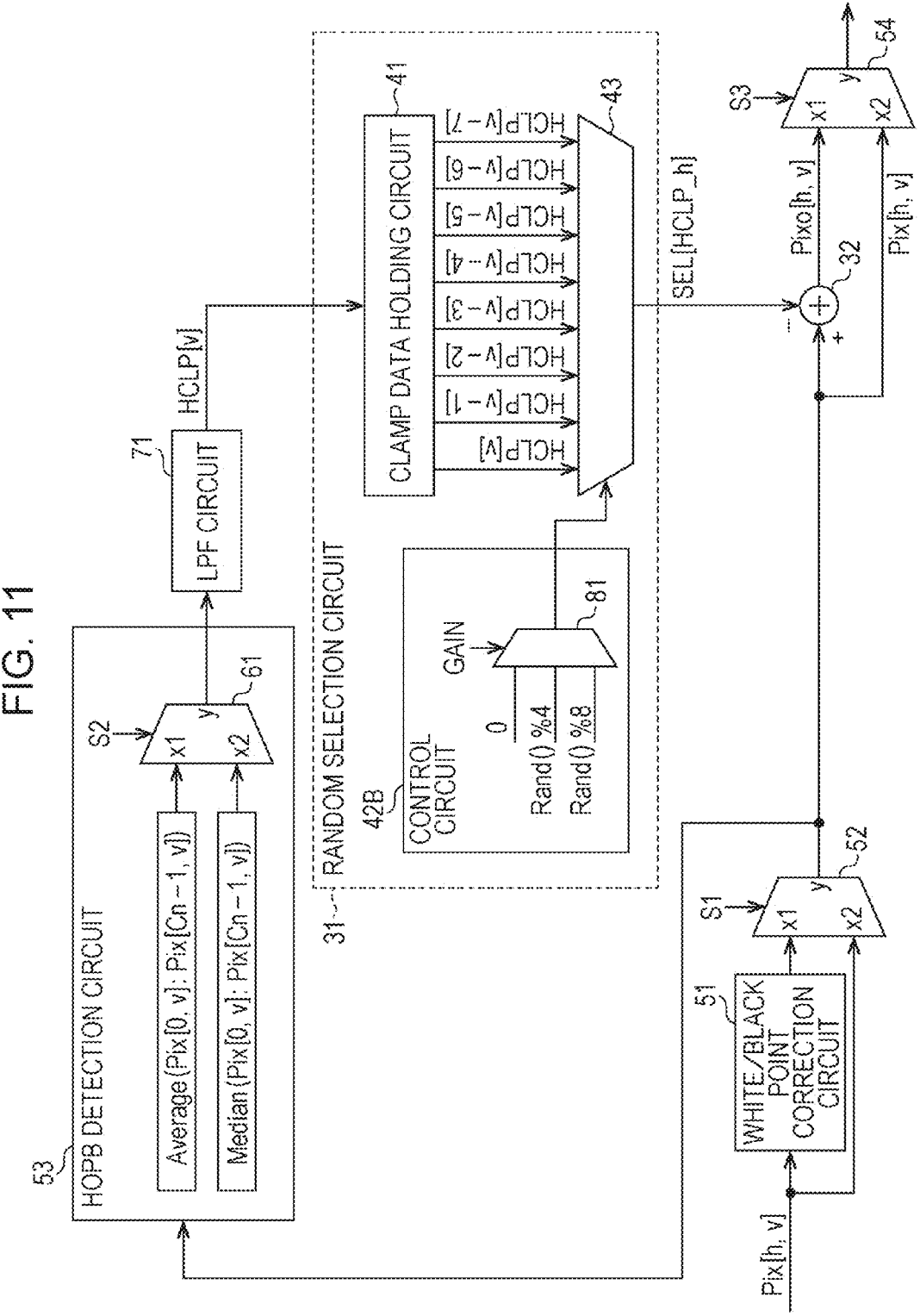
FIG. 11 is a block diagram illustrating a fourth embodiment of the signal processing circuit.

FIG. 11 is a block diagram illustrating a fourth embodiment of the signal processing circuit 12.

In FIG. 11, the parts corresponding to the third embodiment of FIG. 10 are given the same reference numerals, and thus, the description thereof will not be repeated.

In the fourth embodiment, a control circuit 42B is provided instead of the control circuit 42A in the random selection circuit 31.

A gain which is applied to a pixel signal of each pixel of the effective pixel portion 21 of the process target pixel row [v] is input to the selector 81 of the control circuit 42B.

The selector 81 changes the number of rows to be randomly selected based on a gain which is applied to a pixel signal of each pixel of the effective pixel portion 21 of the process target pixel row [v].

For example, the selector 81 selects "0", "four rows", or "eight rows" as the number of rows to be randomly selected, so that as a gain applied to the pixel signal is greater, the number of rows to be randomly selected is increased. Alternatively, the selector 81 may select the number of rows to be randomly selected so that as a gain applied to the pixel signal is smaller, the number of rows to be randomly selected is increased. A method of making a gain and the number of rows to be randomly selected correspond to each other may be changed through settings.

Other configurations and operations according to the fourth embodiment are the same as the ones in the above-described third embodiment.

As above, the selector 81 changes the number of rows to be randomly selected based on a gain of a pixel signal of the process target pixel row [v]. Therefore, even in a case where a pixel signal (an amount of dark shading) of the HOPE region rapidly varies due to the gain, the clamp can follow the variation.

Fifth Embodiment of Signal Processing Circuit 12

Figure 12:
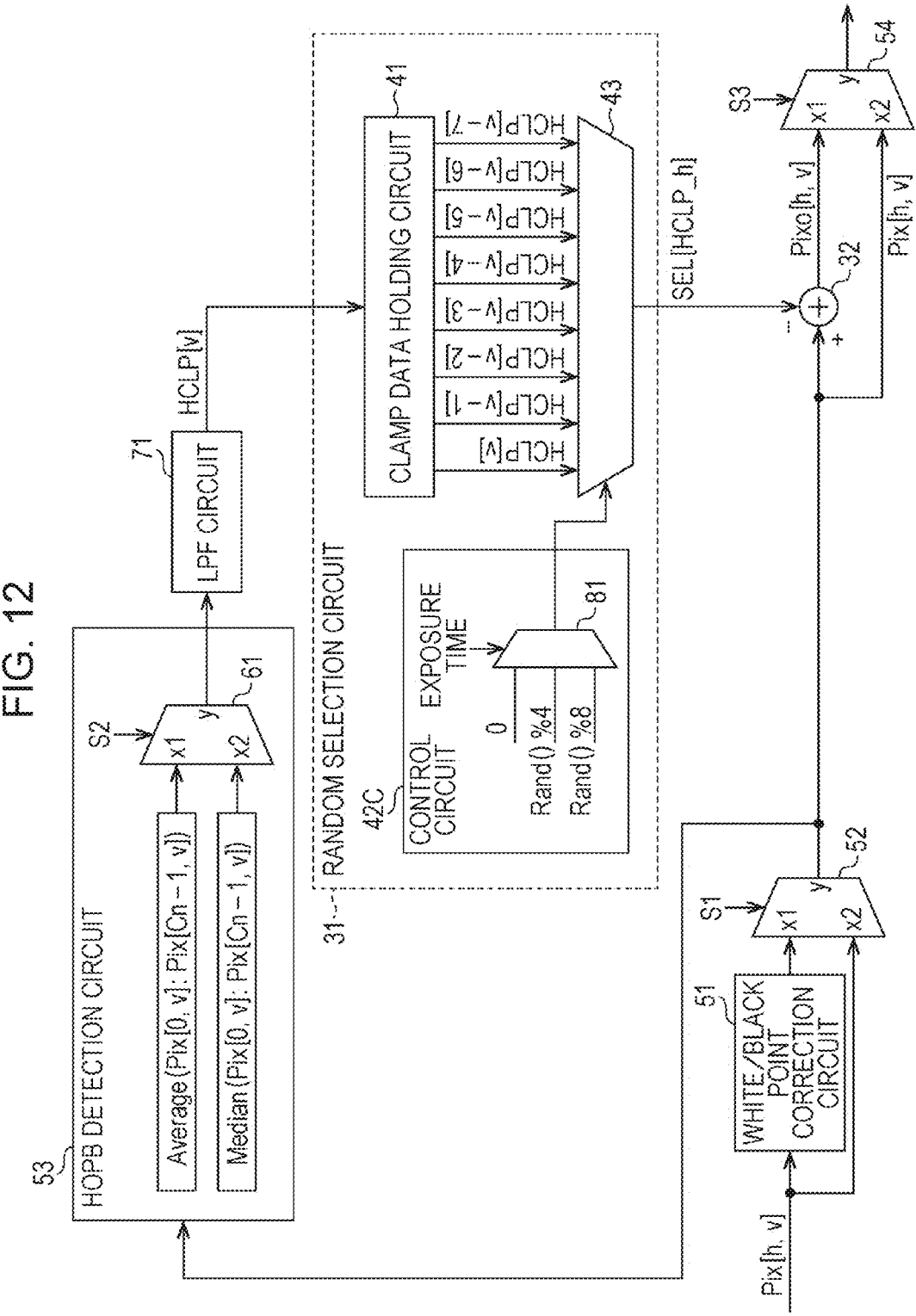
FIG. 12 is a block diagram illustrating a fifth embodiment of the signal processing circuit.

FIG. 12 is a block diagram illustrating a fifth embodiment of the signal processing circuit 12.

In FIG. 12, the parts corresponding to the fourth embodiment of FIG. 11 are given the same reference numerals, and thus, the description thereof will not be repeated.

In the fifth embodiment, a control circuit 42C is provided instead of the control circuit 42B in the random selection circuit 31.

An exposure time of each pixel of the pixel array section 3 is input to the selector 81 of the control circuit 42C.

The selector 81 changes the number of rows to be randomly selected based on an exposure time of each pixel of the pixel array section 3. Specifically, the selector 81 classifies an exposure time into three levels, and performs control so that as the exposure time is longer, the number of rows to be randomly selected is increased.

The dark shading to be corrected is caused by a dark current component which is generated by each pixel 2 of the pixel array section 3. In this case, since a dark shading amount varies in proportion to an exposure time, it is necessary to change the followability of the clamp based on the exposure time.

Therefore, the selector 81 changes the number of rows to be randomly selected based on the exposure time, and thus the clamp can follow a dark shading amount which varies in proportion to the exposure time.

Other configurations and operations according to the fifth embodiment are the same as the ones in the above-described third embodiment.

Sixth Embodiment of Signal Processing Circuit 12

Figure 13:
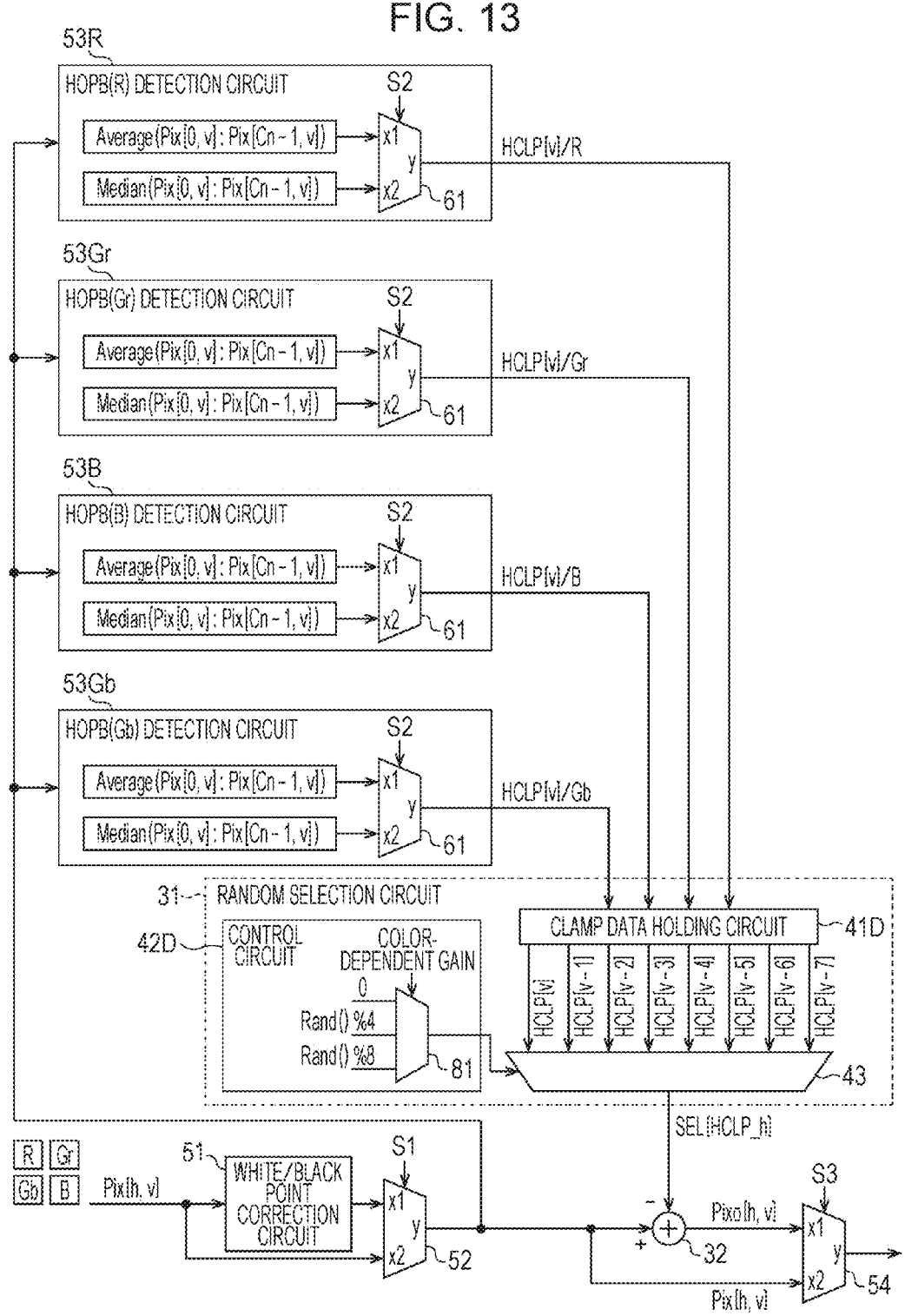
FIG. 13 is a block diagram illustrating a sixth embodiment of the signal processing circuit.

FIG. 13 is a block diagram illustrating a sixth embodiment of the signal processing circuit 12.

In FIG. 13, the parts corresponding to the first embodiment of FIG. 8 are given the same reference numerals, and thus, the description thereof will not be repeated.

In the sixth embodiment, a color array of the respective pixels of the pixel array section 3 is a Bayer array in which the pixels are disposed in a matrix in a combination of red (R), green (Gr), blue (B), and green (Gb), and thus the HOPE detection circuit 53 which obtains the clamp value HCLP[v] of the process target pixel row [v] is provided for each color of R, Gr, B, and Gb.

In other words, in a case where an R pixel is included in the process target pixel row [v], an HOPB(R) detection circuit 53R obtains a clamp value HCLP[v]/R of the process target pixel row [v] using only a pixel signal of R, for outputting to the random selection circuit 31. In a case where a Gr pixel is included in the process target pixel row [v], an HOPB(Gr) detection circuit 53Gr obtains a clamp value HCLP[v]/Gr of the process target pixel row [v] using only a pixel signal of Gr, for outputting to the random selection circuit 31. In a case where a B pixel is included in the process target pixel row [v], an HOPB(B) detection circuit 53B obtains a clamp value HCLP[v]/B of the process target pixel row [v] using only a pixel signal of B, for outputting to the random selection circuit 31. In a case where a Gb pixel is included in the process target pixel row [v], an HOPB(Gb) detection circuit 53Gb obtains a clamp value HCLP[v]/Gb of the process target pixel row [v] using only a pixel signal of Gb, for outputting to the random selection circuit 31.

The random selection circuit 31 according to the sixth embodiment includes a clamp data holding circuit 41D, a control circuit 42D, and a selector 43.

The clamp data holding circuit 41D holds the latest clamp values HCLP[v−7] to HCLP[v] of eight rows for each color of R, Gr, B, and Gb.

A gain (hereinafter, referred to as a color-dependent gain) which is different for each color of each pixel of the pixel array section 3 is input to the selector 81 of the control circuit 42D.

The selector 81 changes the number of rows to be randomly selected based on a color-dependent gain of each pixel of the pixel array section 3. In the same manner as in the above-described fourth embodiment, control may be performed so that as a color-dependent gain is greater, the number of rows to be randomly selected is increased, or control may be performed so that as a color-dependent gain is smaller, the number of rows to be randomly selected is increased. Accordingly, even in a case where a dark shading amount varies due to a variation in a gain which is different for each color, the clamp can follow the variation.

Other configurations and operations according to the sixth embodiment are the same as the ones in the above-described fourth embodiment except that a process is performed for each color.

As above, according to the first to sixth embodiments of the signal processing circuit 12 to which the present technology is applied, a random error (random noise suppression remainder) of a clamp value of the HOPE region is distributed in the column direction, and thus it is possible to suppress a random horizontal line without increasing the number of pixels per row of the HOPE region.

In addition, it is appropriate to combine some of the respective configurations of the above-described first to sixth embodiments. For example, in the sixth embodiment, a configuration may be employed in which the LPF circuit 71 is provided on the rear stage of the HOPE detection circuit 53 of each color.

In the above description, an example has been described in which the signal processing circuit 12 holds the data (clamp values) of a plurality of rows by using, as held data, a row statistic (the average value HOPBA[v] and the median value HOPBM[v]) obtained by performing a statistical process on pixel signals of the HOPE region in the unit of rows, and randomly selects and subtracts the held data of a plurality of rows from the pixel signals in each pixel of the effective pixel portion 21, thereby suppressing a random horizontal line.

However, the present technology is applicable to a process for suppressing a random vertical line. Specifically, the signal processing circuit 12 holds data (clamp values) of a plurality of columns by using, as held data, a column statistic (a average value VOPBA[h] and a median value VOPBM[h]) obtained by performing a statistical process on pixel signals of the VOPB region in the unit of columns. In addition, the signal processing circuit 12 randomly selects and subtracts the held data (clamp values) of a plurality of columns from the pixel signals in each pixel of the effective pixel portion 21. Accordingly, a random error (random noise suppression remainder) of a clamp value of the VOPB region can be distributed in the row direction, and thus it is possible to suppress a random vertical line without increasing the number of pixels per column of the VOPB region.

Specific Configuration Example of Pixel 2

Next, a description will be made of a specific configuration example of the pixel 2 and a specific example of driving control for reading a pixel signal in the solid-state imaging device 1.

Figure 14:
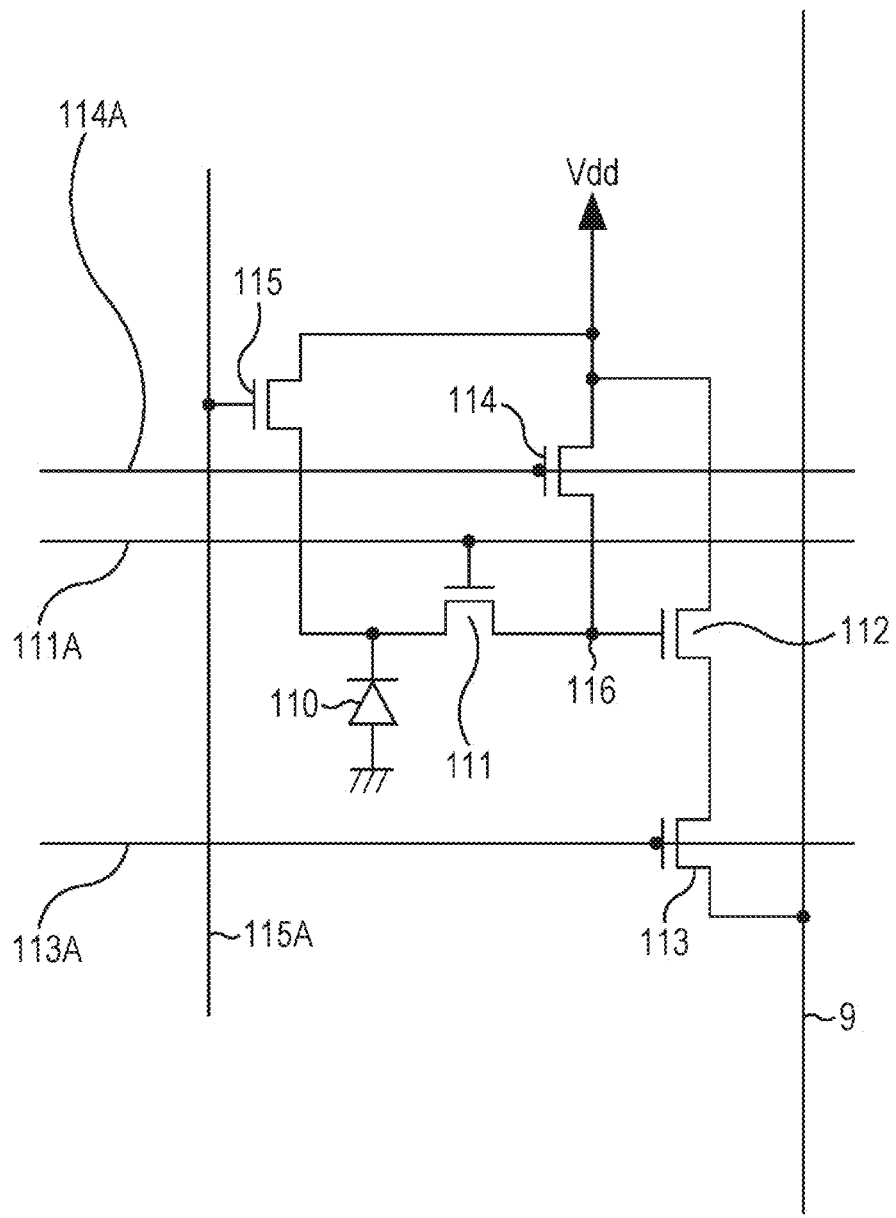
FIG. 14 is a circuit diagram illustrating a specific configuration example of a pixel.

FIG. 14 is a circuit diagram illustrating a specific configuration example of the pixel 2.

The pixel 2 includes a photodiode (PD) 110, a transmission transistor 111, an amplification transistor 112, a selection transistor 113, a reset transistor 114, a discharge transistor 115, and a floating diffusion (FD) 116.

The photodiode 110 is a photoelectric conversion element which generates and accumulates electric charge (signal charge) proportional to a light receiving amount. The photodiode 110 has an anode terminal connected to the ground, and a cathode terminal connected to the FD 116 via the transmission transistor 111. In addition, the cathode terminal of the photodiode 110 is also connected to the discharge transistor 115.

The transmission transistor 111 reads the electric charge generated by the photodiode 110 and transmits the electric charge to the FD 116 when turned on by a transmission signal supplied via a transmission signal line 111A.

The discharge transistor 115 ejects the electric charge generated by the photodiode 110 to a constant power supply Vdd (drain) when turned on by a discharge signal supplied via a discharge signal line 115A.

Here, a gate voltage and a threshold voltage of the transmission transistor 111 and the discharge transistor 115 and a dose amount of the photodiode 110 are adjusted so that both of a channel potential when the discharge transistor 115 is turned on and a channel potential when the transmission transistor 111 is turned on are higher than a completely depleted potential of the photodiode 110. Accordingly, when the transmission transistor 111 is turned on, the overall electric charge accumulated in the photodiode 110 can be transmitted to the FD 116, and when the discharge transistor 115 is turned on, the overall electric charge accumulated in the photodiode 110 can be ejected to the constant power supply Vdd.

The FD 116 holds the electric charge read from the photodiode 110. The reset transistor 114 is turned on by a reset signal supplied via a reset signal line 114A, and, as a result, resets a potential of the FD 116 by ejecting the electric charge accumulated in the FD 116 to the constant power supply Vdd.

The amplification transistor 112 outputs a pixel signal corresponding to a potential of the FD 116. In other words, the amplification transistor 112 forms a source follower circuit along with a load MOS (not illustrated) which is a constant current source connected thereto via the vertical signal line 9. A pixel signal indicating a level corresponding to the electric charge accumulated in the FD 116 is output from the amplification transistor 112 to the column signal processing circuit 5 via the selection transistor 113.

The selection transistor 113 is turned on when the pixel 2 is selected using a selection signal supplied via a selection signal line 113A, and outputs a pixel signal of the pixel 2 to the column signal processing circuit 5 via the vertical signal line 9. The transmission signal line 111A, the selection signal line 113A, the reset signal line 114A, and the discharge transistor 115 correspond to the pixel driving wiring 10 of FIG. 1.

The pixel 2 may employ the above-described configuration.

In addition, the pixel 2 may be formed in a pixel sharing structure. The pixel sharing structure includes a plurality of photodiodes, a plurality of transmission transistors, a shared FD, and other pixel transistors each of which is shared. In other words, the shared pixel is formed by the photodiodes and the transmission transistors, which form a plurality of unit pixels, sharing each of the other pixel transistors.

Figure 15:
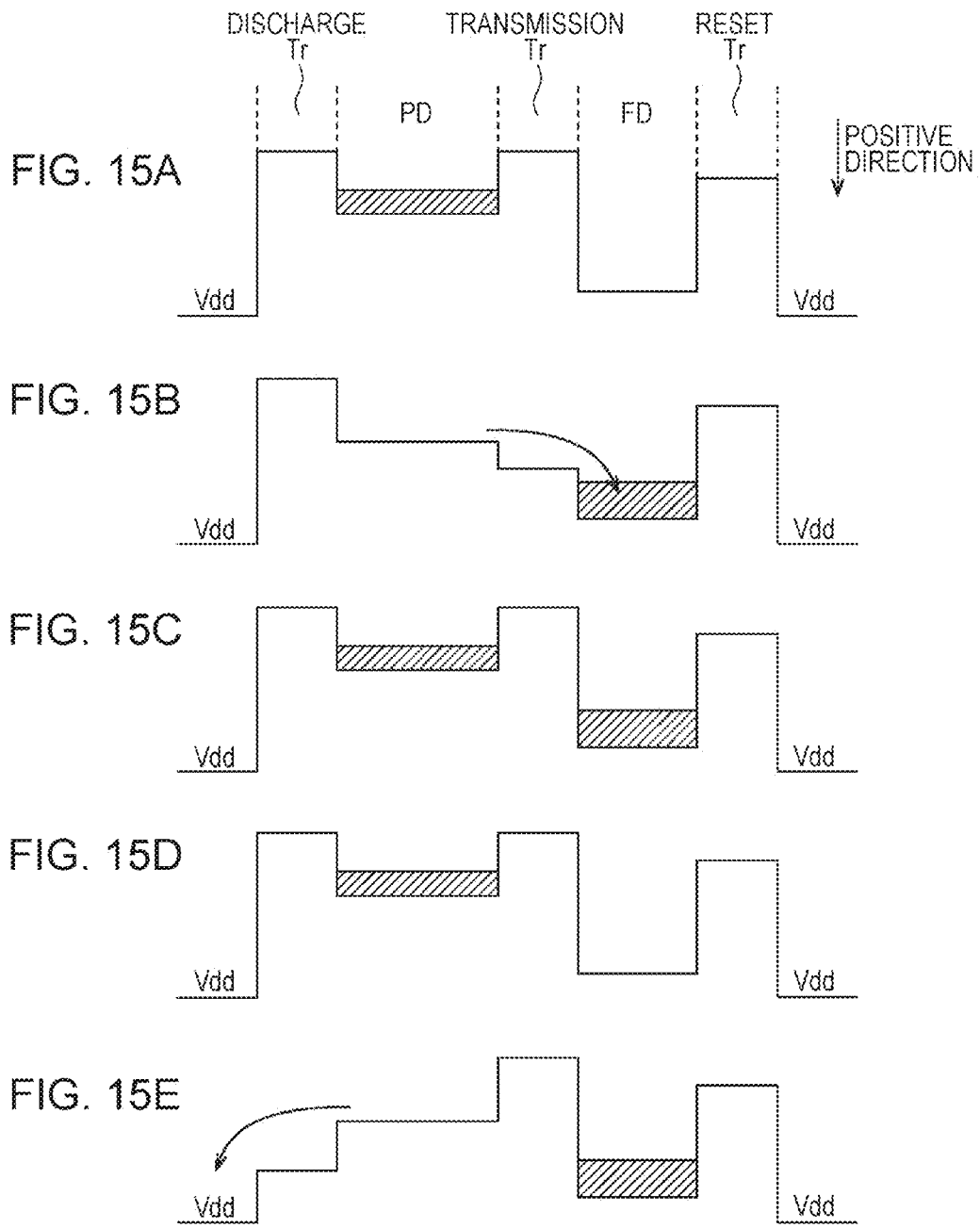
FIGS. 15A to 15E are diagrams illustrating potentials during driving of the pixel.

FIGS. 15A to 15E are diagrams illustrating potentials during driving of the pixel 2. In FIGS. 15A to 15B, the lower direction of the figure indicates a positive direction of a potential.

FIG. 15A illustrates a state immediately after the reset transistor 114 is turned on and thus a potential of the FD 116 is reset during an exposure period.

If the potential of the FD 116 is reset, and, then, the exposure period ends, as illustrated in FIG. 15B, the transmission transistor 111 is turned on, and thus electric charge accumulated in the photodiode 110 is transmitted to the FD 116.

FIG. 15C illustrates a standby state until the electric charge transmitted to the FD 116 is read, and electric charge is gradually accumulated by incident light in the photodiode 110 even during a non-exposure period.

In addition, when the row of the pixel 2 is turned to a read row, as illustrated in FIG. 15D, the selection transistor 113 is turned on, and thus the electric charge held in the FD 116 is converted into a voltage signal so as to be output to the column signal processing circuit 5 via the vertical signal line 9.

In the pixel structure of FIG. 14, the discharge transistor 115 is turned on, and thus the electric charge generated by the photodiode 110 can be ejected to the constant power supply Vdd. Therefore, as illustrated in FIG. 15E, the electric charge accumulated in the photodiode 110 is reset before reading of the electric charge from the FD 116 is completed, thereby starting the next exposure.

Specific example of driving control method of solid-state imaging device 1

Figure 16:
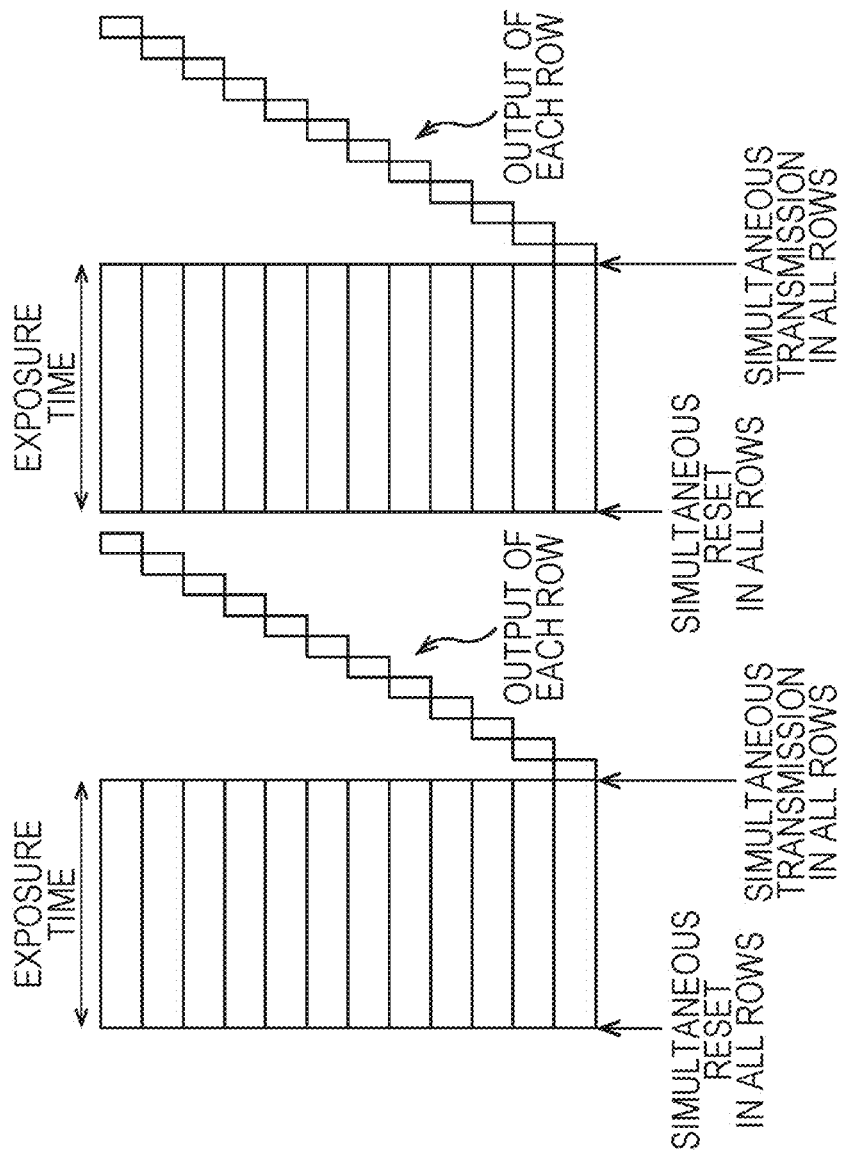
FIG. 16 is a diagram illustrating an example of driving control of the overall pixel array section.

FIG. 16 is a diagram illustrating an example of driving control of the entire pixel array section 3 of the solid-state imaging device 1.

The vertical driving circuit 4 of the solid-state imaging device 1 resets electric charge accumulated in the photodiodes 110 of all the pixels of the pixel array section 3, thereby starting exposure.

In addition, the vertical driving circuit 4 resets the FDs 116 of all the pixels after a predetermined exposure time has elapsed, and then simultaneously transmits the electric charge accumulated in the photodiodes 110 to the FDs 116 in all the pixels.

Subsequently, the vertical driving circuit 4 sequentially outputs the electric charge held in the FDs 116 to the column signal processing circuits 5 row by row.

Due to the above-described driving, the solid-state imaging device 1 can realize driving of simultaneous reading in all the pixels. In this case, the electric charge held in the FD 116 is sequentially read row by row, and a time of holding the electric charge in the FDs 116 is different based on the read order. As the holding time in the FD 116 is longer, electric charge caused by a dark current is added to electric charge generated by the photodiode 110 so as to be accumulated. However, according to the clamp process by the signal processing circuit 12, clamp values of a plurality of rows including the process target pixel row [v] are randomly selected, and thus a random error (random noise suppression remainder) of the clamp value can be distributed in the column direction, thereby suppressing a random horizontal line.

In addition, a dark current may be generated in any solid-state imaging device 1, and thus the clamp process by the signal processing circuit 12 can be applied regardless of the above-described pixel structure or driving control. Configuration example of electronic apparatus to which present technology is applied The present technology is not limited to the application to the solid-state imaging device. In other words, the present technology is generally applicable to electronic apparatuses which use a solid-state imaging device in an image acquisition unit (photoelectric conversion unit), such as an imaging apparatus including a digital still camera or a video camera, a portable terminal apparatus having an imaging function, or a copier which uses a solid-state imaging device in an image reading unit. The solid-state imaging device may have a one-chip form, and may have a module form in which an imaging unit and a signal processing unit or an optical system are packaged together and have an imaging function.

Figure 17:
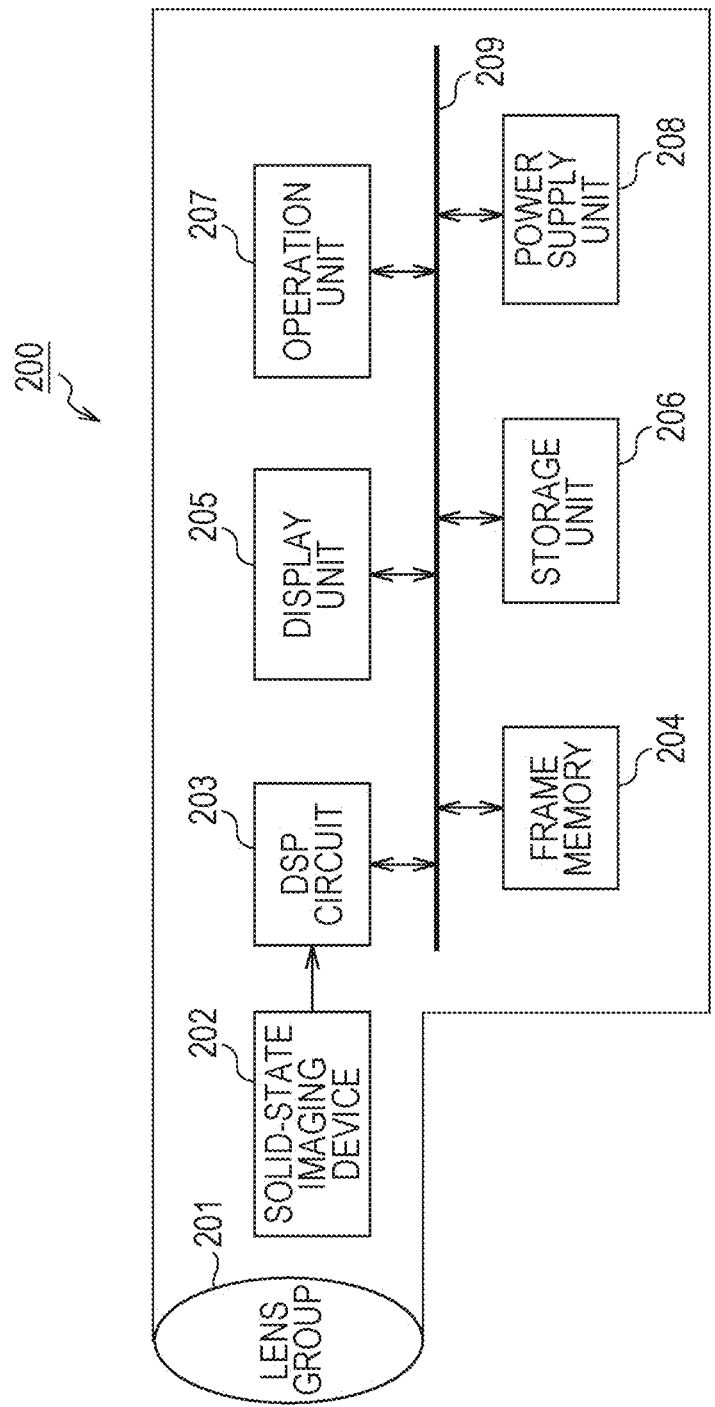
FIG. 17 is a block diagram illustrating a configuration example of an imaging apparatus as an electronic apparatus to which the present technology is applied.

FIG. 17 is a block diagram illustrating a configuration example of an imaging apparatus as an electronic apparatus to which the present technology is applied.

An imaging apparatus 200 of FIG. 17 includes an optical unit 201 which is formed by a lens group and the like, a solid-state imaging device (imaging device) 202, and a digital signal processor (DSP) circuit 203 which is a camera signal processing circuit. In addition, the imaging apparatus 200 also includes a frame memory 204, a display unit 205, a recording unit 206, an operation unit 207, and a power supply unit 208. The DSP circuit 203, the frame memory 204, the display unit 205, the recording unit 206, the operation unit 207, and the power supply unit 208 are connected to each other via a bus line 209.

The optical unit 201 acquires incident light (image light) from a subject so as to image the incident light on an imaging surface of the solid-state imaging device 202. The solid-state imaging device 202 converts a light amount of the incident light imaged on the imaging surface by the optical unit 201 into an electrical signal for each pixel so as to output the electrical signal as a pixel signal. As the solid-state imaging device 202, the above-described solid-state imaging device 1, that is, the solid-state imaging device which can suppress a random horizontal line or vertical line may be used.

The display unit 205 is formed by, for example, a panel type display device such as a liquid crystal panel or an organic electroluminescence (EL) panel, and displays a moving image or a still image captured by the solid-state imaging device 202. The recording unit 206 records a moving image or a still image captured by the solid-state imaging device 202 on a recording medium such as a hard disk or a semiconductor memory.

The operation unit 207 issues operation commands for various functions of the imaging apparatus 200 under the operation of a user. The power supply unit 208 appropriately supplies various power sources which are operation power sources of the DSP circuit 203, the frame memory 204, the display unit 205, the recording unit 206, and the operation unit 207, to the supply targets.

As described above, the solid-state imaging device 1 according to any one of the above-described embodiments is used as the solid-state imaging device 202, and thus it is possible to suppress a random horizontal line or vertical line. Therefore, it is possible to also achieve high image quality of a captured image in the imaging apparatus 200 such as a video camera or a digital still camera, and a camera module for a mobile apparatus such as a mobile phone.

In addition, the present technology is not limited to the application to a solid-state imaging device which detects and captures a distribution of an incident light amount of visible light as an image, and is generally applicable to a solid-state imaging device which captures a distribution of an incidence amount of infrared rays, X rays, or particles, and a solid-state imaging device (a physical quantity detection device) such as a fingerprint detection sensor which detects and captures a distribution of other physical quantities such as pressure or capacitance in a broad sense.

Further, the solid-state imaging device may have a one-chip form, and may have a module form in which an imaging unit and a signal processing unit or an optical system are packaged together and have an imaging function.

An embodiment of the present technology is not limited to the above-described embodiments, and may have various modifications within the scope without departing from the spirit of the present technology.

The present technology may also have the following configurations.

(1) A solid-state imaging device including a pixel array section that includes a light-blocked pixel portion in which a plurality of pixels are arranged in a two-dimensional array form and a photoelectric conversion element included in each pixel is blocked from light, and an effective pixel portion which is not blocked from light; and a signal process circuit that processes a pixel signal output from each pixel of the pixel array section, wherein the signal processing circuit calculates, as held data, a row statistic obtained by performing a statistical process on pixel signals of the light-blocked pixel portion in the unit of rows; holds the held data items of a plurality of rows including a process target row of the pixel array section; randomly selects one of the held data items of a plurality of rows; and subtracts the randomly selected held data item from a pixel signal of the pixel of the process target row in the effective pixel portion.

(2) The solid-state imaging device according to the above (1), wherein the signal processing circuit calculates an average value of the row statistics of a plurality of rows as the held data.

(3) The solid-state imaging device according to the above (1) or (2), wherein the signal processing circuit changes the number of rows of the held data which is a selected target to be randomly selected, based on a spatial frequency of the light-blocked pixel portion of the process target row.

(4) The solid-state imaging device according to the above (1) or (2), wherein the signal processing circuit changes the number of rows of the held data which is a selected target to be randomly selected, based on a gain applied to a pixel signal of the pixel of the process target row in the effective pixel portion.

(5) The solid-state imaging device according to the above (4), wherein the signal processing circuit increases the number of rows of the held data which is a selected target to be randomly selected as the gain is greater.

(6) The solid-state imaging device according to the above (4), wherein the signal processing circuit increases the number of rows of the held data which is a selected target to be randomly selected as the gain is smaller.

(7) The solid-state imaging device according to the above (1) or (2), wherein the signal processing circuit changes the number of rows of the held data which is a selected target to be randomly selected, based on an exposure time of the pixel of the process target row in the effective pixel portion.

(8) The solid-state imaging device according to the above (7), wherein the signal processing circuit increases the number of rows of the held data which is a selected target to be randomly selected as the exposure time is longer.

(9) The solid-state imaging device according to the above (1) or (2), wherein the signal processing circuit calculates the row statistic as held data for each color; holds the held data items of a plurality of rows including a process target row of the pixel array section for each color; randomly selects one of the held data items of a plurality of rows of a color of the pixel, based on a gain which is different for each color; and subtracts the held data item which is randomly selected based on the gain, from a pixel signal of the pixel of the process target row in the effective pixel portion.

(10) The solid-state imaging device according to any one of the above (1) to (9), wherein the row statistic is an average value or a median value of pixel signals of the respective pixels of the light-blocked pixel portion.

(11) The solid-state imaging device according to any one of the above (1) to (10), wherein the pixel at least includes a photoelectric conversion element that generates and accumulates electric charge proportional to a light receiving amount; a transmission transistor that transmits the electric charge accumulated in the photoelectric conversion element; and a floating diffusion that holds the electric charge transmitted by the transmission transistor, and wherein the electric charge accumulated in the photoelectric conversion element is simultaneously transmitted to the floating diffusion in all the pixels, and the electric charge held by the floating diffusion is sequentially output in the unit of rows.

(12) A signal processing method of a solid-state imaging device provided with a pixel array section that includes a light-blocked pixel portion in which a plurality of pixels are arranged in a two-dimensional array form and a photoelectric conversion element included in each pixel is blocked from light, and a signal process circuit that processes a pixel signal output from each pixel of the pixel array section, the signal processing method including causing the signal processing circuit to calculate, as held data, a row statistic obtained by performing a statistical process on pixel signals of the light-blocked pixel portion in the unit of rows; hold the held data items of a plurality of rows including a process target row of the pixel array section; randomly select one of the held data items of a plurality of rows; and subtract the randomly selected held data item from a pixel signal of the pixel of the process target row in the effective pixel portion.

(13) An electronic apparatus including a solid-state imaging device including a pixel array section that includes a light-blocked pixel portion in which a plurality of pixels are arranged in a two-dimensional array form and a photoelectric conversion element included in each pixel is blocked from light, and an effective pixel portion which is not blocked from light; and a signal process circuit that processes a pixel signal output from each pixel of the pixel array section, wherein the signal processing circuit calculates, as held data, a row statistic obtained by performing a statistical process on pixel signals of the light-blocked pixel portion in the unit of rows; holds the held data items of a plurality of rows including a process target row of the pixel array section; randomly selects one of the held data items of a plurality of rows; and subtracts the randomly selected held data item from a pixel signal of the pixel of the process target row in the effective pixel portion.

(14) A solid-state imaging device including a pixel array section that includes a light-blocked pixel portion in which a plurality of pixels are arranged in a two-dimensional array form and a photoelectric conversion element included in each pixel is blocked from light, and an effective pixel portion which is not blocked from light; and a signal process circuit that processes a pixel signal output from each pixel of the pixel array section, wherein the signal processing circuit calculates, as held data, a column statistic obtained by performing a statistical process on pixel signals of the light-blocked pixel portion in the unit of columns; holds the held data items of a plurality of columns including a process target column of the pixel array section; randomly selects one of the held data items of a plurality of columns; and subtracts the randomly selected held data item from a pixel signal of the pixel of the process target column in the effective pixel portion.

(15) The solid-state imaging device according to the above (14), wherein the signal processing circuit calculates an average value of the column statistics of a plurality of columns as the held data.

(16) The solid-state imaging device according to the above (14) or (15), wherein the signal processing circuit changes the number of columns of the held data which is a selected target to be randomly selected, based on a spatial frequency of the light-blocked pixel portion of the process target column.

(17) The solid-state imaging device according to the above (14) or (15), wherein the signal processing circuit changes the number of columns of the held data which is a selected target to be randomly selected, based on a gain applied to a pixel signal of the pixel of the process target column in the effective pixel portion.

(18) The solid-state imaging device according to the above (14) or (15), wherein the signal processing circuit changes the number of columns of the held data which is a selected target to be randomly selected, based on an exposure time of the pixel of the process target column in the effective pixel portion.

(19) A signal processing method of a solid-state imaging device provided with a pixel array section that includes a light-blocked pixel portion in which a plurality of pixels are arranged in a two-dimensional array form and a photoelectric conversion element included in each pixel is blocked from light, and an effective pixel portion which is not blocked from light; and a signal process circuit that processes a pixel signal output from each pixel of the pixel array section, the signal processing method including causing the signal processing circuit to calculate, as held data, a column statistic obtained by performing a statistical process on pixel signals of the light-blocked pixel portion in the unit of columns; hold the held data items of a plurality of columns including a process target column of the pixel array section; randomly select one of the held data items of a plurality of columns; and subtract the randomly selected held data item from a pixel signal of the pixel of the process target column in the effective pixel portion.

(20) An electronic apparatus including a solid-state imaging device including a pixel array section that includes a light-blocked pixel portion in which a plurality of pixels are arranged in a two-dimensional array form and a photoelectric conversion element included in each pixel is blocked from light, and an effective pixel portion which is not blocked from light; and a signal process circuit that processes a pixel signal output from each pixel of the pixel array section, wherein the signal processing circuit calculates, as held data, a column statistic obtained by performing a statistical process on pixel signals of the light-blocked pixel portion in the unit of columns; holds the held data items of a plurality of columns including a process target column of the pixel array section; randomly selects one of the held data items of a plurality of columns; and subtracts the randomly selected held data item from a pixel signal of the pixel of the process target column in the effective pixel portion.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
 a pixel array section that includes a light-blocked pixel portion in which a plurality of pixels are arranged in a two-dimensional array form and a photoelectric conversion element included in each pixel is blocked from light, and an effective pixel portion which is not blocked from light; and
 a signal process circuit that processes a pixel signal output from each pixel of the pixel array section,
 wherein the signal processing circuit
 calculates, as held data, a row statistic obtained by performing a statistical process on pixel signals of the light-blocked pixel portion in the unit of rows;
 holds the held data items of a plurality of rows including a process target row of the pixel array section;
 randomly selects one of the held data items of one of the plurality of rows; and
 subtracts the randomly selected held data item from a pixel signal of the pixel of the process target row in the effective pixel portion.

2. The solid-state imaging device according to claim 1, wherein the signal processing circuit calculates an average value of the row statistics of a plurality of rows as the held data.

3. The solid-state imaging device according to claim 1, wherein the signal processing circuit changes the number of rows of the held data which is a selected target to be randomly selected, based on a spatial frequency of the light-blocked pixel portion of the process target row.

4. The solid-state imaging device according to claim 1, wherein the signal processing circuit changes the number of rows of the held data which is a selected target to be randomly selected, based on a gain applied to a pixel signal of the pixel of the process target row in the effective pixel portion.

5. The solid-state imaging device according to claim 4, wherein the signal processing circuit increases the number of rows of the held data which is a selected target to be randomly selected as the gain is greater.

6. The solid-state imaging device according to claim 4, wherein the signal processing circuit increases the number of rows of the held data which is a selected target to be randomly selected as the gain is smaller.

7. The solid-state imaging device according to claim 1, wherein the signal processing circuit changes the number of rows of the held data which is a selected target to be randomly selected, based on an exposure time of the pixel of the process target row in the effective pixel portion.

8. The solid-state imaging device according to claim 7, wherein the signal processing circuit increases the number of rows of the held data which is a selected target to be randomly selected as the exposure time is longer.

9. The solid-state imaging device according to claim 1, wherein the signal processing circuit
 calculates the row statistic as held data for each color;
 holds the held data items of a plurality of rows including a process target row of the pixel array section for each color;
 randomly selects one of the held data items of a plurality of rows of a color of the pixel, based on a gain which is different for each color; and
 subtracts the held data item which is randomly selected based on the gain, from a pixel signal of the pixel of the process target row in the effective pixel portion.

10. The solid-state imaging device according to claim 1, wherein the row statistic is an average value or a median value of pixel signals of the respective pixels of the light-blocked pixel portion.

11. The solid-state imaging device according to claim 1, wherein the pixel at least includes
 a photoelectric conversion element that generates and accumulates electric charge proportional to a light receiving amount;
 a transmission transistor that transmits the electric charge accumulated in the photoelectric conversion element; and
 a floating diffusion that holds the electric charge transmitted by the transmission transistor, and
 wherein the electric charge accumulated in the photoelectric conversion element is simultaneously transmitted to the floating diffusion in all the pixels, and the electric charge held by the floating diffusion is sequentially output in the unit of rows.

12. A signal processing method of a solid-state imaging device provided with a pixel array section that includes a light-blocked pixel portion in which a plurality of pixels are arranged in a two-dimensional array form and a photoelectric conversion element included in each pixel is blocked from light, and an effective pixel portion which is not blocked from light; and a signal process circuit that processes a pixel signal output from each pixel of the pixel array section, the signal processing method comprising:
 causing the signal processing circuit to
 calculate, as held data, a row statistic obtained by performing a statistical process on pixel signals of the light-blocked pixel portion in the unit of rows;
 hold the held data items of a plurality of rows including a process target row of the pixel array section;
 randomly select one of the held data items of one of the plurality of rows; and subtract the randomly selected held data item from a pixel signal of the pixel of the process target row in the effective pixel portion.

13. An electronic apparatus comprising:
a solid-state imaging device including
a pixel array section that includes a light-blocked pixel portion in which a plurality of pixels are arranged in a two-dimensional array form and a photoelectric conversion element included in each pixel is blocked from light, and an effective pixel portion which is not blocked from light; and
a signal process circuit that processes a pixel signal output from each pixel of the pixel array section,
wherein the signal processing circuit
calculates, as held data, a row statistic obtained by performing a statistical process on pixel signals of the light-blocked pixel portion in the unit of rows;
holds the held data items of a plurality of rows including a process target row of the pixel array section;
randomly selects one of the held data items of one of the plurality of rows; and
subtracts the randomly selected held data item from a pixel signal of the pixel of the process target row in the effective pixel portion.

14. A solid-state imaging device comprising:
a pixel array section that includes a light-blocked pixel portion in which a plurality of pixels are arranged in a two-dimensional array form and a photoelectric conversion element included in each pixel is blocked from light, and an effective pixel portion which is not blocked from light; and
a signal process circuit that processes a pixel signal output from each pixel of the pixel array section,
wherein the signal processing circuit
calculates, as held data, a column statistic obtained by performing a statistical process on pixel signals of the light-blocked pixel portion in the unit of columns;
holds the held data items of a plurality of columns including a process target column of the pixel array section;
randomly selects one of the held data items of one of the plurality of columns; and
subtracts the randomly selected held data item from a pixel signal of the pixel of the process target column in the effective pixel portion.

15. The solid-state imaging device according to claim 14, wherein the signal processing circuit calculates an average value of the column statistics of a plurality of columns as the held data.

16. The solid-state imaging device according to claim 14, wherein the signal processing circuit changes the number of columns of the held data which is a selected target to be randomly selected, based on a spatial frequency of the light-blocked pixel portion of the process target column.

17. The solid-state imaging device according to claim 14, wherein the signal processing circuit changes the number of columns of the held data which is a selected target to be randomly selected, based on a gain applied to a pixel signal of the pixel of the process target column in the effective pixel portion.

18. The solid-state imaging device according to claim 14, wherein the signal processing circuit changes the number of columns of the held data which is a selected target to be randomly selected, based on an exposure time of the pixel of the process target column in the effective pixel portion.

19. A signal processing method of a solid-state imaging device provided with a pixel array section that includes a light-blocked pixel portion in which a plurality of pixels are arranged in a two-dimensional array form and a photoelectric conversion element included in each pixel is blocked from light, and an effective pixel portion which is not blocked from light; and a signal process circuit that processes a pixel signal output from each pixel of the pixel array section, the signal processing method comprising:
causing the signal processing circuit to
calculate, as held data, a column statistic obtained by performing a statistical process on pixel signals of the light-blocked pixel portion in the unit of columns;
hold the held data items of a plurality of columns including a process target column of the pixel array section;
randomly select one of the held data items of one of the plurality of columns; and
subtract the randomly selected held data item from a pixel signal of the pixel of the process target column in the effective pixel portion.

20. An electronic apparatus comprising:
a solid-state imaging device including
a pixel array section that includes a light-blocked pixel portion in which a plurality of pixels are arranged in a two-dimensional array form and a photoelectric conversion element included in each pixel is blocked from light, and an effective pixel portion which is not blocked from light; and
a signal process circuit that processes a pixel signal output from each pixel of the pixel array section,
wherein the signal processing circuit
calculates, as held data, a column statistic obtained by performing a statistical process on pixel signals of the light-blocked pixel portion in the unit of columns;
holds the held data items of a plurality of columns including a process target column of the pixel array section;
randomly selects one of the held data items of one of the plurality of columns; and
subtracts the randomly selected held data item from a pixel signal of the pixel of the process target column in the effective pixel portion.

* * * * *